US012806816B2

(12) United States Patent
Osada et al.

(10) Patent No.: US 12,806,816 B2
(45) Date of Patent: Nov. 24, 2026

(54) ROUTER

(71) Applicant: Koki Holdings Co., Ltd., Tokyo (JP)

(72) Inventors: Yoshiaki Osada, Ibaraki (JP); Takeru Kumakura, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 612 days.

(21) Appl. No.: 17/773,043

(22) PCT Filed: Sep. 30, 2020

(86) PCT No.: PCT/JP2020/037215

§ 371 (c)(1),
(2) Date: Apr. 29, 2022

(87) PCT Pub. No.: WO2021/085018

PCT Pub. Date: May 6, 2021

(65) Prior Publication Data

US 2022/0388196 A1 Dec. 8, 2022

(30) Foreign Application Priority Data

Oct. 31, 2019 (JP) ................................ 2019-198180
Mar. 30, 2020 (JP) ................................ 2020-059488

(51) Int. Cl.
*B27C 5/10* (2006.01)

(52) U.S. Cl.
CPC .................................... *B27C 5/10* (2013.01)

(58) Field of Classification Search
CPC ...................................................... B27C 5/10
See application file for complete search history.

(56) References Cited

U.S. PATENT DOCUMENTS 5,310,296 A 5/1994 Mccurry
5,694,992 A 12/1997 Kikuchi
6,261,036 B1 * 7/2001 Bosten ..................... B27C 5/10 409/206

(Continued)

FOREIGN PATENT DOCUMENTS

CN 1504307 6/2004
CN 202727040 2/2013

(Continued)

OTHER PUBLICATIONS

"Office Action of China Counterpart Application", issued on Jul. 27, 2022, with English translation thereof, pp. 1-13.

(Continued)

*Primary Examiner* — Matthew Katcoff
(74) *Attorney, Agent, or Firm* — JCIPRNET

(57) ABSTRACT

Provided is a router that suppresses a deterioration in stability. In the router 10, a battery holder 60 is provided on the upper side of a motor housing 33, and a battery 70 is detachably attached to the battery holder 60. Therefore, electric power can be supplied from the battery 70 to a motor 40 to drive the motor. Accordingly, convenience can be improved. Here, when viewed from a direction orthogonal to the vertical direction, an angle between a virtual line IL passing through an outer circumferential lower end of a base 20 and the center of gravity G of the router 10 and the lower surface of the base 20 is set to 80 degrees or less.

14 Claims, 20 Drawing Sheets

(56) References Cited

U.S. PATENT DOCUMENTS

| | | | | |
|---|---|---|---|---|
| 6,558,090 | B2 * | 5/2003 | Lagaly ................ | H01M 50/227<br>144/136.95 |
| 6,896,451 | B2 * | 5/2005 | Oberheim ................. | B27C 5/10<br>144/136.95 |
| 7,367,760 | B2 * | 5/2008 | Onose ....................... | B27C 5/10<br>409/218 |
| 9,511,507 | B2 * | 12/2016 | Schnell ..................... | B27C 5/10 |
| 2003/0044251 | A1 | 3/2003 | Lagaly et al. | |
| 2004/0250890 | A1 | 12/2004 | Nishikawa et al. | |
| 2008/0149222 | A1 | 6/2008 | Zaiser et al. | |
| 2008/0152448 | A1 * | 6/2008 | Zaiser ....................... | B27C 5/10<br>409/137 |
| 2010/0018609 | A1 * | 1/2010 | Van Der Linde ......... | B27C 5/10<br>409/206 |
| 2011/0073335 | A1 * | 3/2011 | Kato ......................... | B25F 3/00<br>173/217 |
| 2012/0241049 | A1 | 9/2012 | Kato et al. | |
| 2019/0190351 | A1 | 6/2019 | Gregorich et al. | |
| 2023/0237306 | A1 * | 7/2023 | Seow ..................... | G06N 3/088<br>706/12 |

FOREIGN PATENT DOCUMENTS

| | | |
|---|---|---|
| CN | 102990142 | 3/2013 |
| CN | 203141600 | 8/2013 |
| CN | 107530897 | 1/2018 |
| CN | 115023326 | 9/2022 |
| JP | H10202604 | 8/1998 |
| JP | 2007203675 | 8/2007 |
| JP | 2011073159 | 4/2011 |
| JP | 2012196866 | 10/2012 |
| JP | 2014148017 | 8/2014 |
| JP | 2018079632 | 5/2018 |
| TW | M547923 | 9/2017 |

OTHER PUBLICATIONS

"Search Report of Europe Counterpart Application", issued on Dec. 1, 2022, p. 1-p. 7.

"Office Action of China Counterpart Application" with English translation thereof, issued on Oct. 10, 2023, p. 1-p. 19.

"Office Action of China Counterpart Application", issued on Jun. 10, 2023, with English translation thereof, pp. 1-20.

"International Search Report (Form PCT/ISA/210) of PCT/JP2020/037215", mailed on Dec. 8, 2020, with English translation thereof, pp. 1-6.

"Office Action of Europe Counterpart Application", issued on Jun. 18, 2025, p. 1-p. 6.

* cited by examiner

ROUTER

CROSS-REFERENCE TO RELATED APPLICATION

This application is a 371 application of the International PCT application serial no. PCT/JP2020/037215, filed on Sep. 30, 2020, which claims the priority benefits of Japan Patent Application No. 2019-198180, filed on Oct. 31, 2019 and Japan Patent Application No. 2020-059488, filed on Mar. 30, 2020. The entirety of each of the above-mentioned patent applications is hereby incorporated by reference herein and made a part of this specification.

TECHNICAL FIELD

The present invention relates to a router.

BACKGROUND ART

In a router described in Patent Literature 1 below, a main body is connected to a base by a column to be relatively movable in an vertical direction. Further, a motor and a control board are provided inside the main body and a power cord supplying electric power to the motor extends upward from the main body. Then, the power cord is connected to an outlet to supply electric power to the motor so that a workpiece is cut.

CITATION LIST

Patent Literature

[Patent Literature 1]
Japanese Patent Laid-Open No. 2007-203675

SUMMARY OF INVENTION

Technical Problem

Here, in recent years, in order to improve convenience, there is a demand for a working machine in which a battery is mounted instead of a power cord and power is supplied by the battery. Then, when the battery is provided in the router, there is a possibility that the stability in the posture of the router deteriorates due to the weight of the mounted battery.

An objective of the present invention is to provide a router which can be driven by a battery while suppressing a deterioration in stability in consideration of the above-described circumstances.

Solution to Problem

According to one or more embodiments of the present invention, there is provided a router for cutting a workpiece. The router includes: a main body housing which accommodates a motor; a base which is provided below the main body housing and is able to come into contact with the workpiece; an elevation mechanism which supports the main body housing to be relatively movable so that the main body housing is brought into contact with and separated from the base in an vertical direction; a pair of handles which is provided in the main body housing and protrudes outward in a left and right direction; a battery holder which is provided in the main body housing; and a battery which is mounted on the battery holder in an attachable/detachable manner, wherein an angle formed between a lower surface of the base and an virtual line passing through a center of gravity of the router and an outer peripheral lower end portion of the base when viewed from a direction orthogonal to the vertical direction is 80 degrees or less.

In the router according to one or more embodiments of the present invention, a power line for supplying electric power from the battery to the motor is connected to the motor by a connector, and the connector is disposed on a radially outer side of the motor.

In the router according to one or more embodiments of the present invention, the base is formed in a disk shape having a notch portion formed at a front end portion to be notched in a linear shape in the left and right direction, and the connector is disposed on a rear side of an axis of the motor.

In the router according to one or more embodiments of the present invention, the battery holder includes a plurality of holder members, the main body housing includes a fixing portion fixing the holder member, and the fixing portion is disposed on a radially outer side of the motor.

In the router according to one or more embodiments of the present invention, a control unit controlling the motor is accommodated in the battery holder and is disposed on an upper side of the motor and the fixing portion.

In the router according to one or more embodiments of the present invention, a control unit controlling the motor is accommodated in the battery holder and the connector is positioned by the control unit.

In the router according to one or more embodiments of the present invention, an engagement portion is formed in the main body housing on a radially outer side of the motor, and the battery holder is provided with an engaged portion engaging with the engagement portion in the vertical direction.

In the router according to one or more embodiments of the present invention, a battery side intake hole is formed at a side portion of the battery and a battery side exhaust hole is formed at a lower portion of the battery, and a holder side intake hole is formed at an upper end portion of the battery holder and the battery side exhaust hole and the holder side intake hole are arranged to face each other in the vertical direction.

In the router according to one or more embodiments of the present invention, a control unit controlling the motor is disposed on a radially outer side of the motor.

In the router according to one or more embodiments of the present invention, a position of the center of gravity is at a same position with at least a portion of the handle in the vertical direction.

In the router according to one or more embodiments of the present invention, a length from a lower surface of the base to an upper surface of the battery in the vertical direction is 300 mm or less.

In the router according to one or more embodiments of the present invention, the main body housing is provided with a handle fixing portion for fixing the handle to the main body housing, and in the vertical direction, a distance from a center of the handle fixing portion to the center of gravity is smaller than a distance from the center of the handle fixing portion to an upper end position of the handle.

In the router according to one or more embodiments of the present invention, the battery is mounted on the battery holder from left to right.

In the router according to one or more embodiments of the present invention, the elevation mechanism includes two columns, a left accommodation portion accommodating one of the columns is provided on a left side of the main body housing, a right accommodation portion accommodating the other one of the columns is provided on a right side of the main body housing, an upper end position of the right accommodation portion is lower than the left accommodation portion, and an inner space of the battery holder is located above the right accommodation portion.

Advantageous Effects of Invention

According to one or more embodiments of the present invention, it is possible to drive the battery while suppressing a deterioration in stability.

DESCRIPTION OF EMBODIMENTS

First Embodiment

Figure 1:
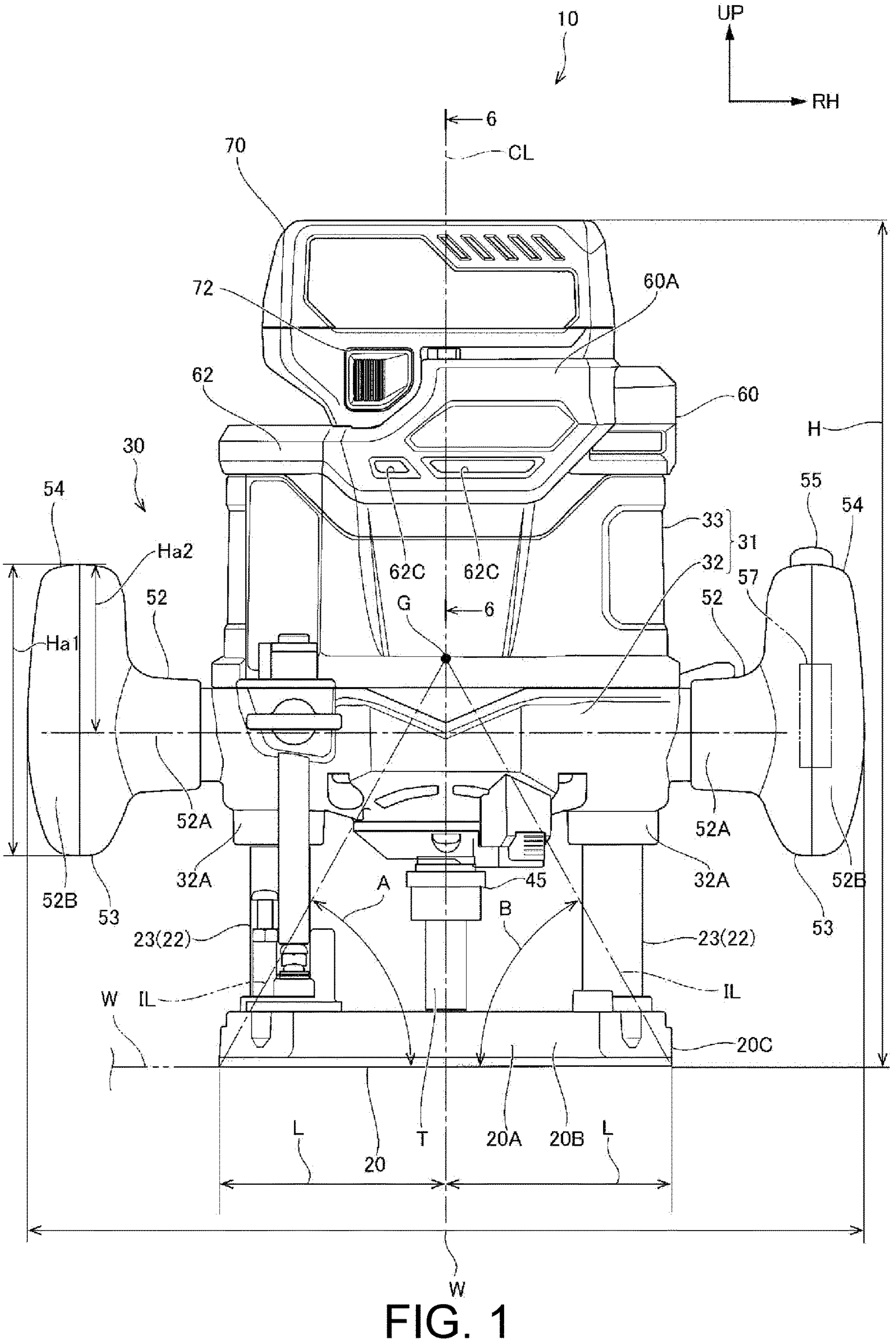
FIG. 1 is a front view showing a router according to a first embodiment when viewed from the front side.

Hereinafter, a router 10 according to a first embodiment will be described with reference to FIGS. 1 to 10. The arrows UP, FR, and RH appropriately shown in the drawings indicate the upper side, the front side, and the right side (one side in the width direction) of the router 10, respectively. Then, in the following description, the up and down, front and rear, and left and right directions of the router 10 are used to indicate the vertical direction, the front and rear direction, and the left and right direction of the router 10 unless otherwise specified.

The router 10 is placed on the upper side of a workpiece W and is configured as a tool for cutting the workpiece W. As shown in FIGS. 1 to 4, the router 10 includes a base 20, a router main body 30, a battery holder 60 which is a "battery holder", a battery 70 which is a "battery", and a control unit 80 (see FIG. 5). Hereinafter, each configuration of the router 10 will be described.

(Base 20)

The base 20 constitutes the lower end portion of the router 10. The base 20 is formed in a plate shape with the vertical direction as the plate thickness direction and is formed in a substantially D shape in a plan view. Specifically, a notch portion 20A is formed at the front end portion of the base 20 and the front end portion of the base 20 extends in a linear shape in the left and right direction. More specifically, the outer peripheral portion of the base 20 constitutes the front end portion of the base 20 and includes a linear outer peripheral portion 20B which extends in a linear shape in the left and right direction and an arc-shaped outer peripheral portion 20C which connects both longitudinal end portions of the linear outer peripheral portion 20B and extends in an arc shape to protrude backward. Further, a circular insertion portion 20D is formed at the substantially center portion of the base 20 to penetrate the base in the vertical direction. Then, the center line CL of the insertion portion 20D and the center line of the arc-shaped outer peripheral portion 20C coincide with each other. Accordingly, when the distance between the center line CL and the outer peripheral portion of the base 20 is the distance L, the distance L between the center line CL and the center portion of the linear outer peripheral portion 20B in the left and right direction is the minimum of the distance L (see FIG. 3).

The base 20 is provided with an elevation mechanism 22. The elevation mechanism 22 includes a pair of left and right columns 23 and the column 23 is formed in a substantially cylindrical shape with the vertical direction as the axial direction. The lower end portions of the columns 23 are fixed to both end portions of the base 20 in the left and right direction and the column 23 extends upward from the base 20. Further, the position of the axis of the column 23 in the front and rear direction and the position of the center line CL coincide with each other.

Further, the elevation mechanism 22 includes a position adjusting bolt 24. The position adjusting bolt 24 extends in the vertical direction on the rear side of the left column 23. The lower end portion of the position adjusting bolt 24 is fixed to the base 20 and the position adjusting bolt 24 extends upward from the base 20. Further, a position adjusting nut 25 (see FIG. 4) is screwed into the upper end portion of the position adjusting bolt 24.

(Router Main Body 30)

As shown in FIGS. 1 to 5, the router main body 30 includes a main body housing 31 which constitutes the outer shell of the router main body 30, a motor 40 and a retaining ring 50 which are accommodated in the main body housing 31, and a pair of left and right handles 52 which is attached to the main body housing 31. Further, the main body housing 31 includes an end bracket 32 which constitutes the lower portion of the main body housing 31 and a motor housing 33 which constitutes the upper portion of the main body housing 31. Hereinafter, each configuration of the router main body 30 will be described.

<End Bracket 32>

Figure 5:
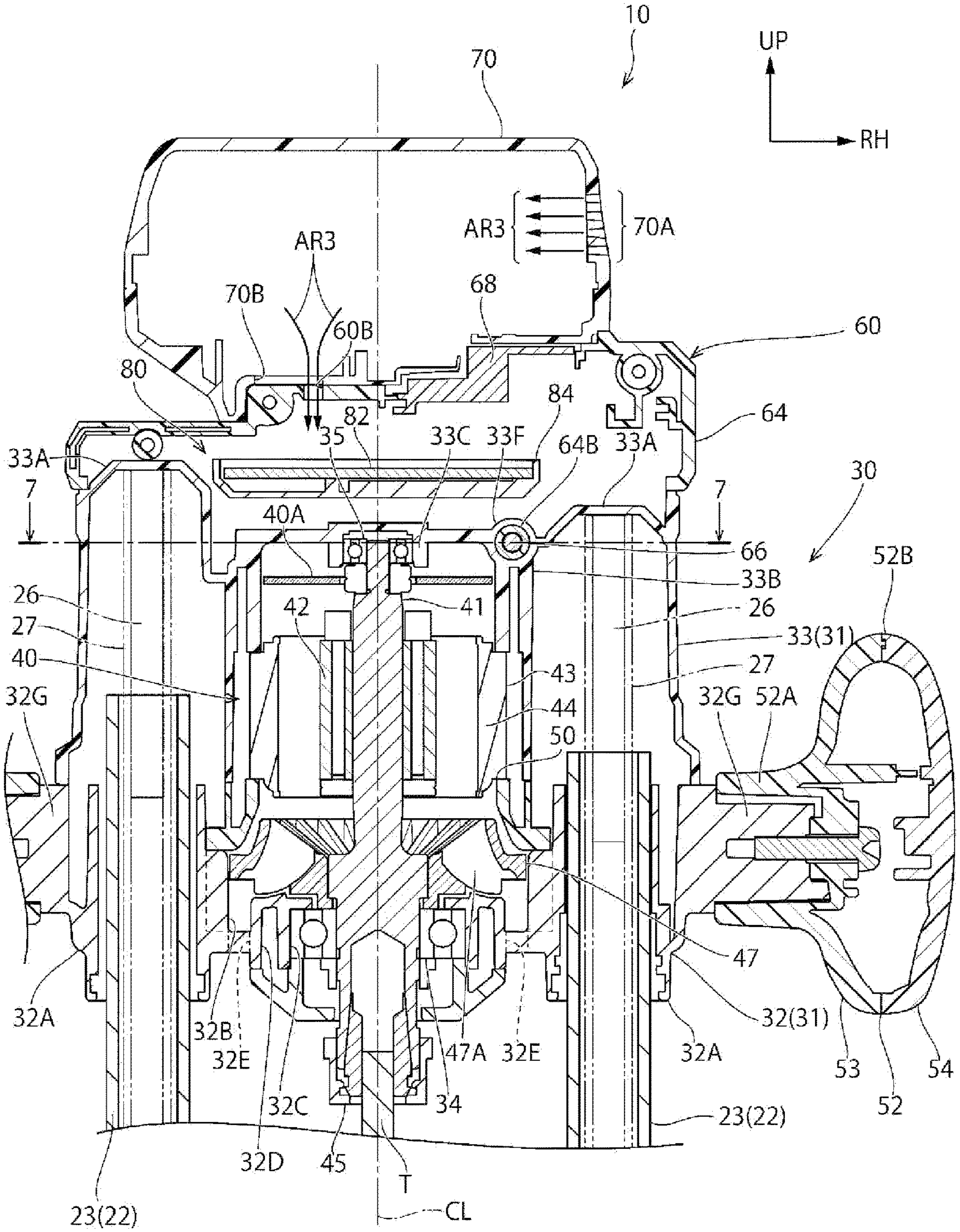
FIG. 5 is a cross-sectional view showing the router shown in FIG. 2 when viewed from the front side (a cross-sectional view taken along the line 5-5 of FIG. 2).

The end bracket 32 is formed of metal. The end bracket 32 is formed in a substantially rectangular parallelepiped box shape that is opened upward with the left and right direction as the longitudinal direction. The end bracket 32 has a single piece structure and is indivisible. As shown in FIG. 5, a pair of connection cylinder portions 32A is formed at both end portions of the end bracket 32 in the left and right direction. The connection cylinder portion 32A is formed in a substantially cylindrical shape with the vertical direction as the axial direction and protrudes upward and downward from the bottom wall of the end bracket 32. Then, the column 23 is inserted into the connection cylinder portion 32A to be relatively movable in the vertical direction.

A fan accommodation portion 32B for accommodating a fan 47 to be described later is formed at the center portion of the end bracket 32 in the left and right direction between the pair of connection cylinder portions 32A. The fan accommodation portion 32B is formed in a substantially cylindrical shape and protrudes upward from the bottom wall of the end bracket 32. Further, a substantially cylindrical support cylinder portion 32C is formed on the inside of the fan accommodation portion 32B in the radial direction of the end bracket 32 and the inside of the support cylinder portion 32C is penetrated in the vertical direction. Further, the support cylinder portion 32C is disposed coaxially with the fan accommodation portion 32B and the axis of the support cylinder portion 32C coincides with the center line CL. The support cylinder portion 32C is provided with a plurality of relief grooves 32D which is opened downward and the relief grooves 32D are arranged side by side along the circumferential direction of the support cylinder portion 32C. Further, a bearing 34 for supporting a rotation shaft 41 of the motor 40 to be described later is provided on the inside of the support cylinder portion 32C in the radial direction.

Further, a plurality of exhaust holes 32E is formed between the fan accommodation portion 32B and the support cylinder portion 32C in the bottom wall of the end bracket 32. The plurality of exhaust holes 32E is formed in an elongated hole shape along the circumferential direction of the fan accommodation portion 32B and is arranged side by side in the circumferential direction of the fan accommodation portion 32B.

Further, both end portions of the end bracket 32 in the left and right direction are provided with a handle fixing portion 32G for fixing a handle 52 to be described later. The handle fixing portion 32G is formed in a substantially columnar shape with the left and right direction as the axial direction and protrudes from the end bracket 32 outward in the left and right direction.

Figure 3:
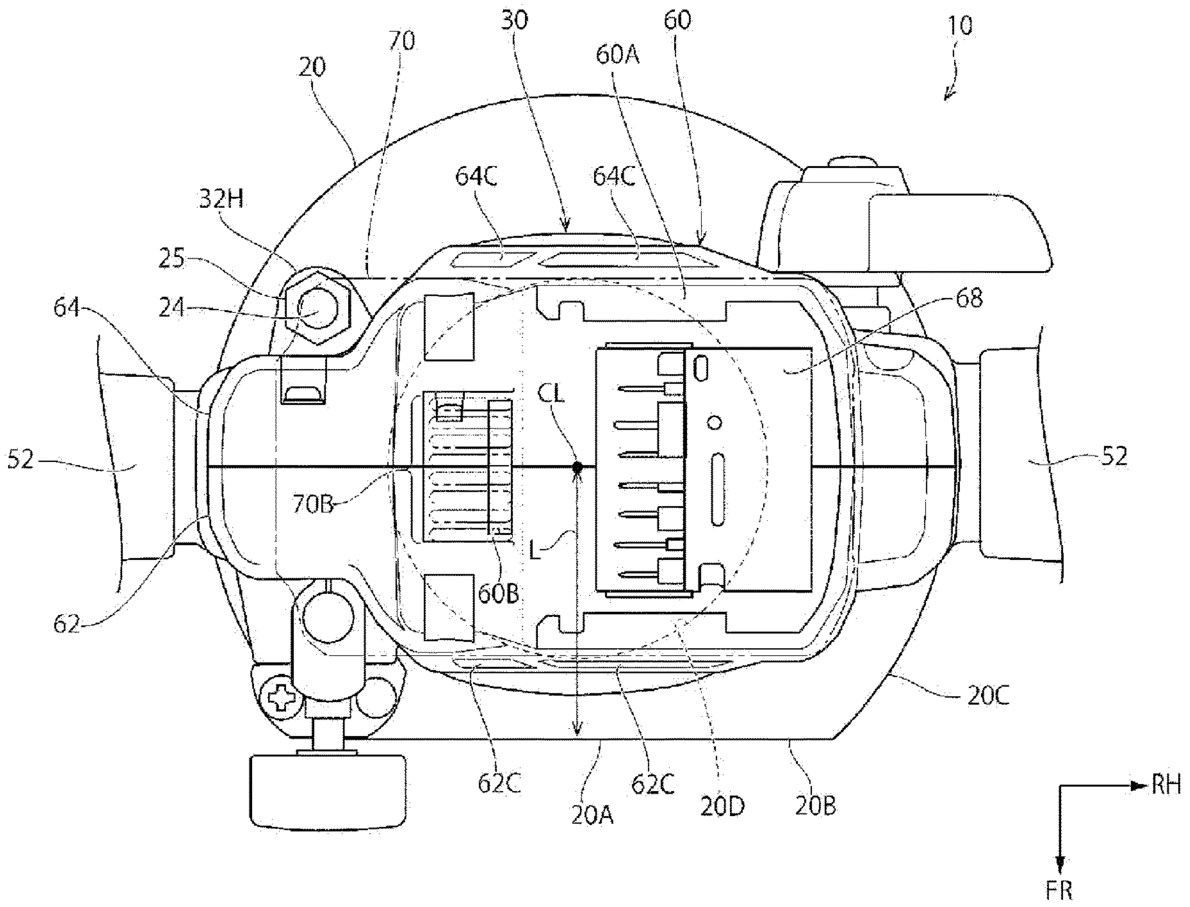
FIG. 3 is a plan view showing the router shown in FIG. 1 when viewed from above.
Figure 4:
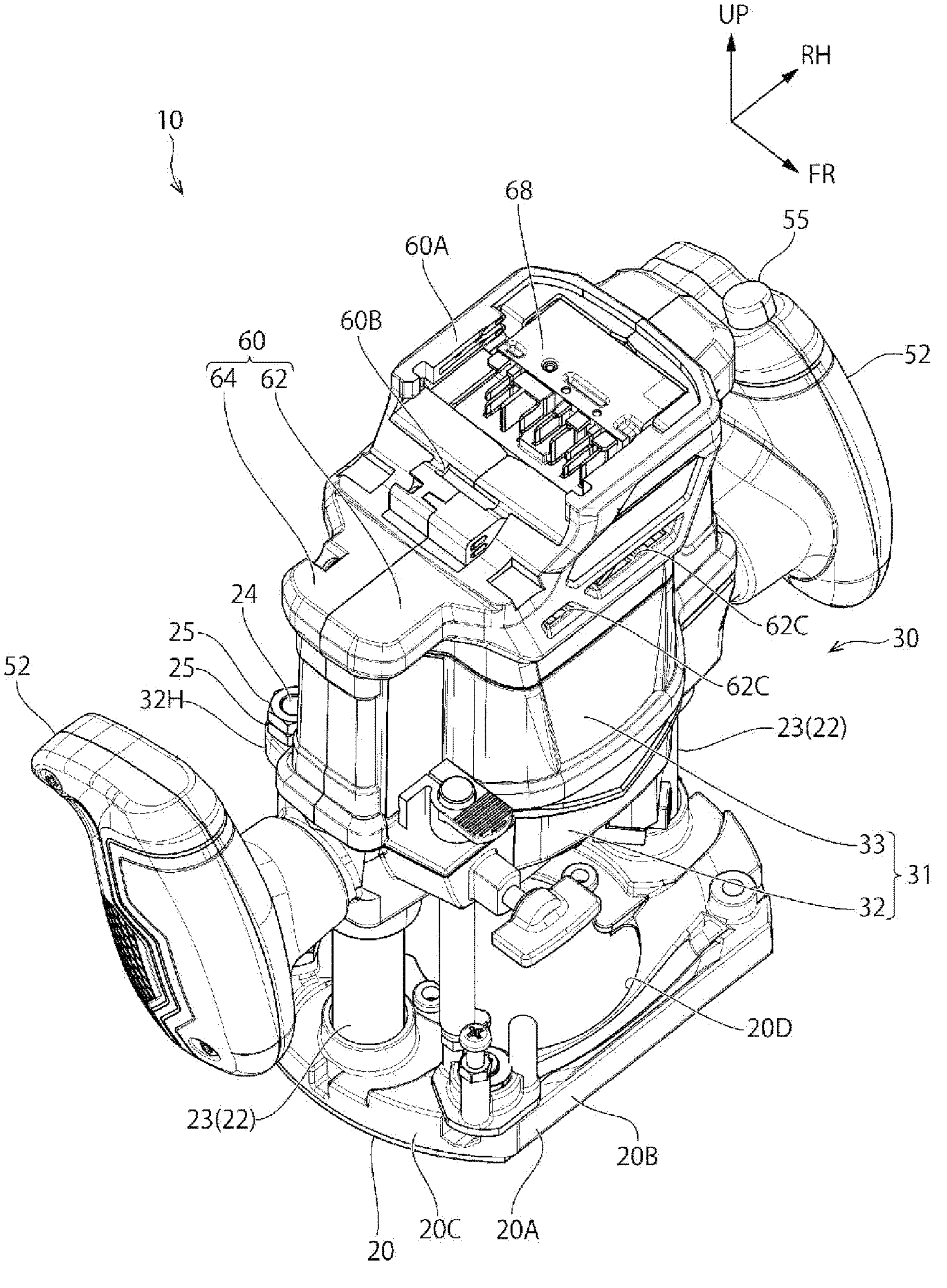
FIG. 4 is a perspective view showing the router shown in FIG. 1 in a state in which a battery is separated from a battery holder when viewed from the leftward inclined upper side.

As shown in FIGS. 3 and 4, the outer peripheral portion of the left end portion of the end bracket 32 is provided with a stopper portion 32H which protrudes backward. The stopper portion 32H is formed in a substantially tubular shape with the vertical direction as the axial direction. Then, the position adjusting bolt 24 is inserted through the stopper portion 32H and the stopper portion 32H is disposed on the lower side of the position adjusting nut 25.

<Motor Housing 33>

As shown in FIGS. 5 to 8, the motor housing 33 is formed of resin and is disposed adjacently on the upper side of the end bracket 32. The motor housing 33 is formed in a substantially rectangular box shape (cylindrical shape) that is opened downward. The motor housing 33 is formed as a single piece and is indivisible, for example, in the front and rear direction and the left and right direction. Further, the opening portion of the motor housing 33 is formed in a shape corresponding to the opening portion of the end bracket 32. Then, the motor housing 33 is fastened and fixed to the end bracket 32 to close the opening portion of the end bracket 32.

A pair of left and right raised portions 33AR and 33AL is formed at both end portions of the upper wall of the motor housing 33 in the left and right direction. The raised portions 33AR and 33AL are formed in a substantially bottomed cylindrical shape that is raised upward and opened downward and are arranged coaxially with the connection cylinder portion 32A of the end bracket 32. Further, a pair of left and right connection shafts 26 (see FIG. 5) constituting the elevation mechanism 22 is provided inside the motor housing 33 and the connection shaft 26 is formed in a substantially cylindrical shape with the vertical direction as the axial direction. The connection shaft 26 extends downward from the upper walls of the raised portions 33AR and 33AL and is inserted into the column 23 to be relatively movable in the vertical direction. Further, an urging spring 27 (see FIG. 5) configured as a compression coil spring is extrapolated to the connection shaft 26 and the urging spring 27 constitutes a part of the elevation mechanism 22. The upper end portion of the urging spring 27 is locked to the upper walls of the raised portions 33AR and 33AL. On the other hand, the lower portion of the urging spring 27 is inserted into the column 23 and the lower end portion of the urging spring 27 is locked to the base 20. Additionally, the upper end position of the right raised portion 33AR serving as the "right accommodation portion" and the upper end position of the left raised portion 33AL serving as the "left accommodation portion" are set to different positions in the vertical direction. Specifically, the upper end position of the right raised portion 33AR is set to be lower than the left raised portion 33AL. Accordingly, a wiring space can be ensured by widening the space inside the battery holder 60 located above the raised portion 33AR, which will be described later.

Figure 2:
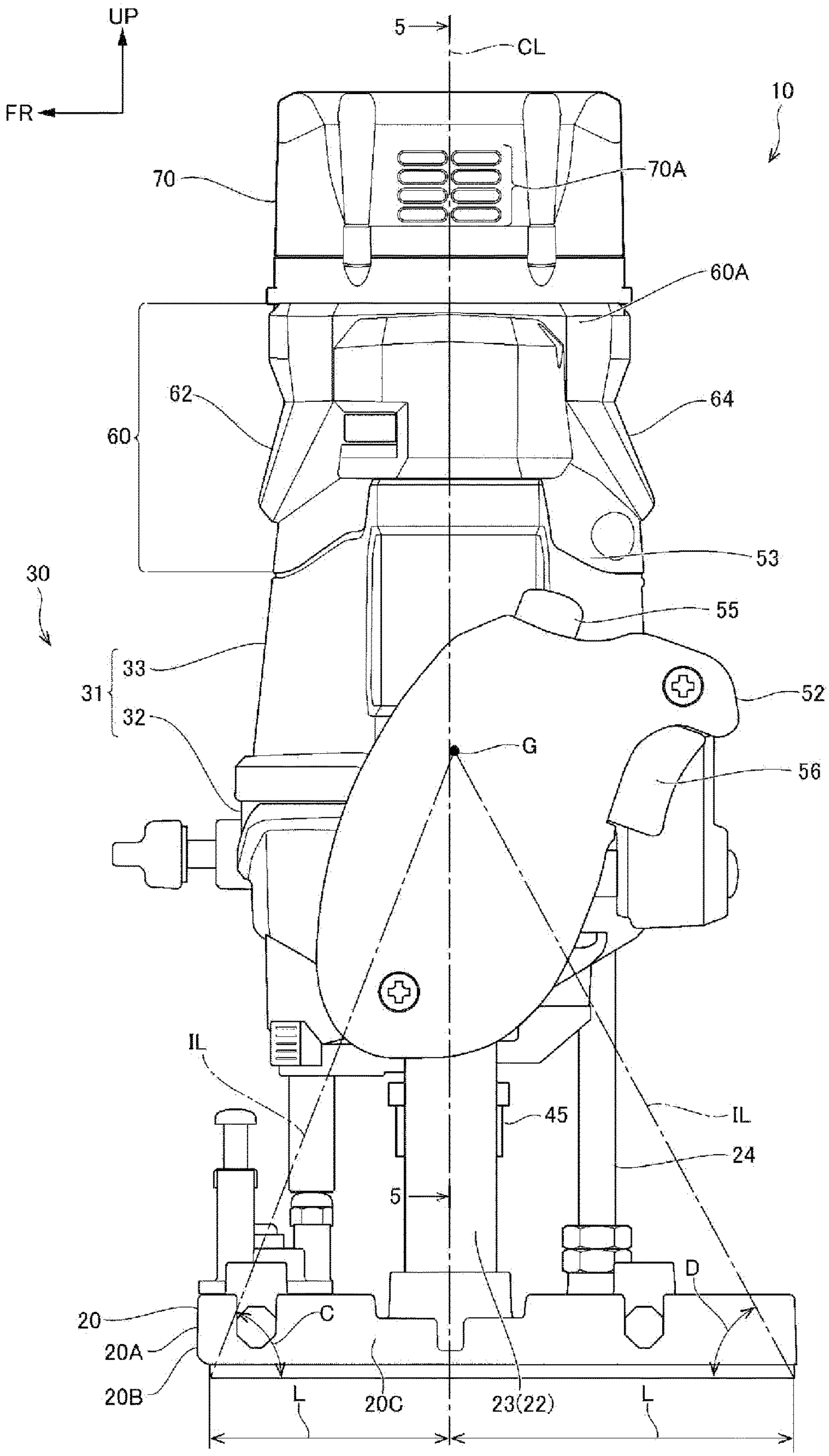
FIG. 2 is a side view showing the router shown in FIG. 1 when viewed from the right side.

Then, the motor housing 33 (that is, the router main body 30) is urged upward by the urging spring 27 and the stopper portion 32H of the router main body 30 comes into contact with the position adjusting nut 25 of the position adjusting bolt 24 from the lower side. Thus, the router main body 30 is held at a position in which the stopper portion 32H comes into contact with the position adjusting nut 25 (hereinafter, this position will be referred to as the initial position of the router main body 30). Then, when the position of the position adjusting nut 25 with respect to the position adjusting bolt 24 is changed, the initial position of the router main body 30 in the vertical direction is changed. Specifically, the position of the router main body 30 shown in FIGS. 1 and 2 is set as the initial position in which the router main body 30 is disposed at the uppermost side (hereinafter, this position will be referred to as the highest initial position).

Then, the router main body 30 is pressed down from the initial position against the urging force of the urging spring 27 so that the router main body 30 moves downward with respect to the base 20 and approaches the base 20. Further, the position in which the router main body 30 is closest to the base 20 is referred to as the lowest position (see FIG. 10).

A motor accommodation portion 33B for accommodating the motor 40 to be described later is formed at the center portion of the motor housing 33 in the left and right direction. The motor accommodation portion 33B is formed in a substantially bottomed cylindrical shape that is opened downward and the upper end portion of the motor accommodation portion 33B protrudes slightly above the upper wall of the motor housing 33 and is disposed below the upper end portions of the raised portions 33AR and 33AL. Further, the axis of the motor accommodation portion 33B coincides with the center line CL.

A bearing fixing portion 33C is formed at the center portion of the upper wall of the motor accommodation portion 33B and the bearing fixing portion 33C is formed in a bottomed cylindrical shape that is opened downward. Further, four communication holes 33D1 to 33D4 (see FIGS. 7 and 8) are formed at four positions of the upper wall of the motor accommodation portion 33B on the outer side of the bearing fixing portion 33C in the radial direction to penetrate the upper wall and the communication holes 33D1 to 33D4 are formed in a substantially fan shape in a plan view. Further, one communication hole 33D1 is disposed on the leftward inclined rear side of the bearing fixing portion 33C and four communication holes 33D1 to 33D4 are arranged every 90 degrees in the circumferential direction of the motor accommodation portion 33B.

The inner peripheral surface of the side wall of the motor accommodation portion 33B is provided with eight guide ribs 33E (see FIGS. 7 and 8) and the guide rib 33E extends in the vertical direction. Further, in the guide rib 33E, four sets of guide ribs 33E are arranged at predetermined intervals in the circumferential direction of the motor accommodation portion 33B with the pair of guide ribs 33E as one set.

The upper end portion of the motor housing 33 is provided with a housing side fixing portion 33F serving as a "fixing portion" for fixing the battery holder 60 to be described later. The housing side fixing portion 33F is formed at the right side of the bearing fixing portion 33C and the boundary portion between the upper wall and the side wall of the motor accommodation portion 33B. That is, the position of the bearing fixing portion 33C and the position of the housing side fixing portion 33F substantially coincide with each other in the vertical direction. The housing side fixing portion 33F is formed in a substantially cylindrical shape with the front and rear direction as the axial direction. A cylindrical fixing wall 33F1 (see FIG. 7) which projects radially inward is formed at the intermediate portion in the front and rear direction inside the housing side fixing portion 33F and the inside of the fixing wall 33F1 is formed as a fixing hole 33F2 (see FIG. 7). Accordingly, the opening portions on the front side and the rear side of the housing side fixing portion 33F communicate with each other by the fixing hole 33F2.

A connector accommodation portion 33G (see FIGS. 7 and 8) is formed on the outer side of the motor accommodation portion 33B in the radial direction in the upper wall of the motor housing 33. Specifically, the connector accommodation portion 33G is disposed on the outer side of the communication hole 33D1 in the radial direction. The connector accommodation portion 33G is formed in a concave shape that is opened upward and extends along the circumferential direction of the motor accommodation portion 33B in a plan view. Further, the front end portion of the connector accommodation portion 33G is disposed between the left raised portion 33AL and the motor accommodation portion 33B.

A housing side engagement rib 33H serving as a "pair of upper and lower engagement portions" is formed on a front side of the communication hole 33D2 and a communication hole 33D3 in the outer peripheral portion of the upper end portion of the motor accommodation portion 33B. The housing side engagement ribs 33H extend in the left and right direction with the vertical direction as the plate thickness direction and are arranged side by side in the vertical direction. Further, a pair of housing side engagement ribs 33J serving as "engagement portions" is formed on the rear side of the communication hole 33D4 in the outer peripheral portion of the upper end portion of the motor accommodation portion 33B. The housing side engagement ribs 33J extend in the left and right direction with the vertical direction as the plate thickness direction and are arranged side by side in the vertical direction.

Further, a wiring hole 33K (see FIGS. 7 and 8) is formed at the rear position of the housing side fixing portion 33F to penetrate the upper wall of the motor housing 33. The wiring hole 33K is disposed on the outer side of the motor accommodation portion 33B in the radial direction. Accordingly, the inside and the outer side of the motor housing 33 communicate with each other by the wiring hole 33K on the outer side of the motor accommodation portion 33B in the radial direction. Further, the right end portion of the lower end portion of the motor housing 33 is provided with a wiring groove 33L (see FIG. 8) that is opened downward and the inside and the outer side of the motor housing 33 communicate with each other by the wiring groove 33L.

<Motor 40>

Figure 6:
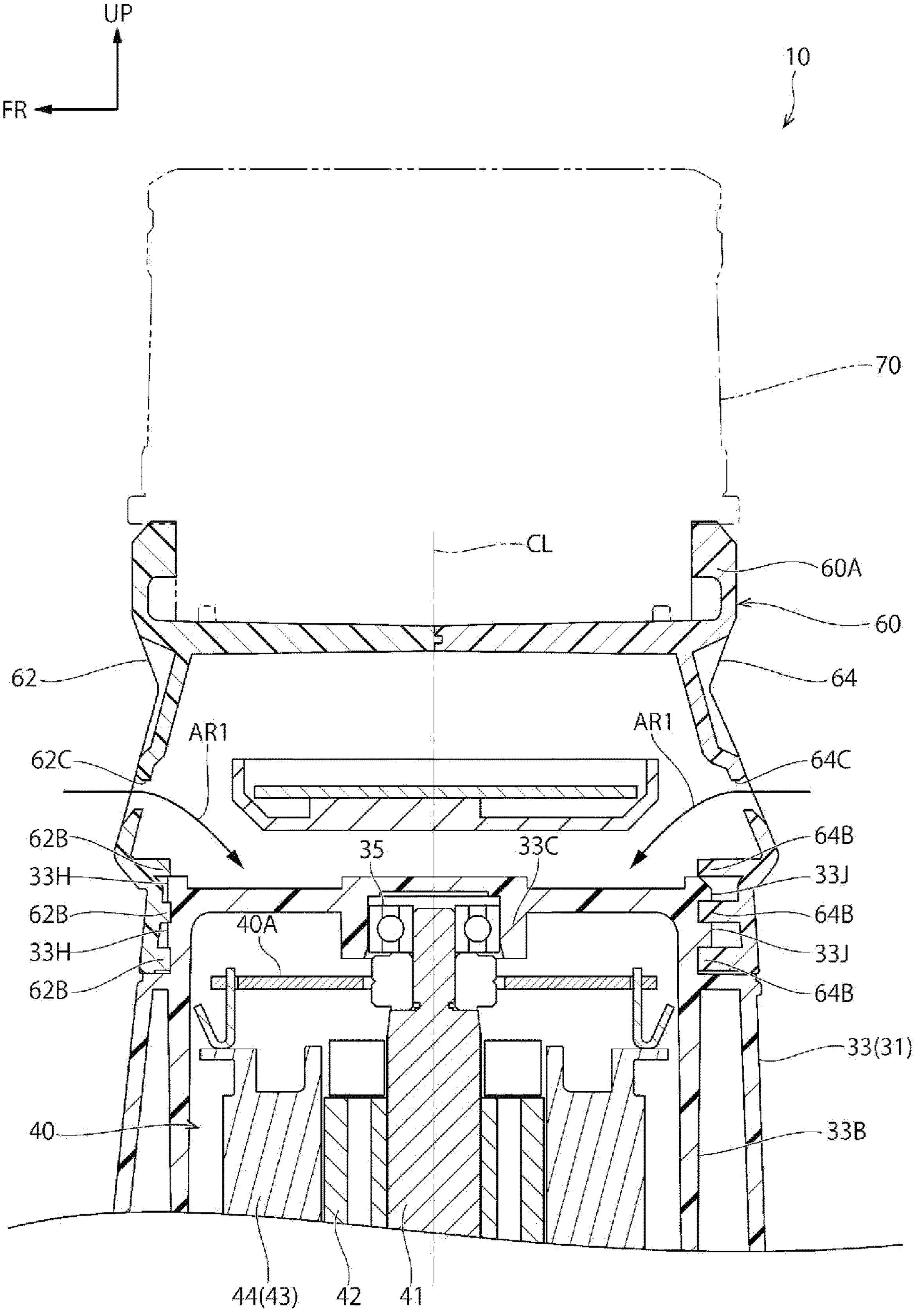
FIG. 6 is a cross-sectional view showing the inside of the battery holder of the router shown in FIG. 1 when viewed from the right side (a cross-sectional view taken along the line 6-6 of FIG. 1).

As shown in FIGS. 5 and 6, the motor 40 is accommodated in the motor accommodation portion 33B of the motor housing 33. The motor 40 includes the rotation shaft 41 which is provided with the vertical direction as the axial direction, a substantially cylindrical rotor 42 which is fixed to the rotation shaft 41, and a substantially cylindrical stator 43 which is disposed on the outer side of the rotor 42 in the radial direction. The motor 40 is a brushless motor which uses a permanent magnet in the rotor 42 and controls and drives the energization of a coil provided in the stator 43.

The rotation shaft 41 is disposed coaxially with the motor accommodation portion 33B and the lower end portion of the rotation shaft 41 protrudes downward from the motor housing 33 to be inserted through the support cylinder portion 32C of the end bracket 32. Then, the lower end portion of the rotation shaft 41 is rotatably supported by the bearing 34 supported by the support cylinder portion 32C of the end bracket 32 and the upper end portion of the rotation shaft 41 is rotatably supported by the bearing 35 fixed to the bearing fixing portion 33C of the motor housing 33. Accordingly, the housing side fixing portion 33F of the motor housing 33 is disposed on the outer side of the upper end portion of the rotation shaft 41 (the motor 40) in the radial direction. Since both the motor housing 33 and the end bracket 32 form an indivisible single piece structure, each of the support cylinder portion 32C and the bearing fixing portion 33C also form an indivisible structure. Accordingly, since the bearing 34 and the bearing 35 are firmly supported, the rotation support of the rotation shaft 41 can be performed firmly and accurately. Further, a tip tool T is attached to the lower end portion of the rotation shaft 41 through a collet chuck 45. Accordingly, the tip tool T is allowed to be inserted through the insertion portion 20D of the base 20 when the router main body 30 is pressed downward from the initial position.

The stator 43 includes a stator holder 44 and the stator holder 44 has a substantially cylindrical shape. A stator coil (not shown) is wound around the stator holder 44 and the stator coil is connected to a motor substrate 40A provided at the upper end portion of the motor 40. Then, the guide rib 33E of the motor housing 33 is disposed adjacently on the outer side of the stator holder 44 in the radial direction while being accommodated in the motor accommodation portion 33B of the motor 40 (see FIG. 7). Accordingly, the stator holder 44 (the stator 43) is disposed coaxially with the rotation shaft 41. Further, the upward movement of the stator holder 44 is restricted by a rib (not shown) formed in the motor housing 33 and the downward movement of the stator holder 44 is restricted by the retaining ring 50 to be described later.

As shown in FIG. 5, the fan 47 is provided at the lower end portion of the rotation shaft 41 to be integrally rotatable below the rotor 42 and the stator 43. Specifically, the fan 47 is disposed on the upper side of the support cylinder portion 32C of the end bracket 32 and the inside of the upper portion of the fan accommodation portion 32B in the radial direction. Further, the upper portion of the fan 47 protrudes upward from the fan accommodation portion 32B. The fan 47 includes a plurality of blades 47A. The blades 47A extend in the radial direction of the rotation shaft 41 and are arranged side by side in the rotation direction of the fan 47. Further, in this embodiment, the fan 47 is configured as a so-called axial fan. Then, when the fan 47 rotates, air (cooling air) flowing from a first intake hole 62C, a first intake hole 64C, and a second intake hole 60B to be described later cools the control unit 80 and flows from the communication holes 33D1 to 33D4 of the motor housing 33 into the motor accommodation portion 33B to cool the motor 40. After the air cools the motor 40, the air is rectified to the lower side of the fan 47 and flows out from the exhaust hole 32E to the lower side.

<Retaining Ring 50>

As a whole, the retaining ring 50 is formed in a substantially ring shape (substantially cylindrical shape) with the vertical direction as the axial direction and is formed in a substantially U shape that is opened upward in a cross-sectional view from the circumferential direction. Then, the retaining ring 50 is disposed on the outer side of the fan 47 in the radial direction inside the end bracket 32. Specifically, the bottom portion of the retaining ring 50 is disposed adjacently on the upper side of the fan accommodation portion 32B of the end bracket 32 and the outer peripheral portion of the retaining ring 50 is disposed adjacently on the lower side of a part of the lower end portion of the motor housing 33. Accordingly, the retaining ring 50 is sandwiched by the end bracket 32 and the motor housing 33 in the vertical direction and is fixed to them. Further, the inner peripheral portion of the retaining ring 50 comes into contact with the lower end of the stator holder 44. Accordingly, the downward movement of the stator 43 is regulated by the retaining ring 50.

<Handle 52>

As shown in FIGS. 1 and 2, the handle 52 is formed in a hollow substantially T shape rotated by 90 degrees when viewed from the front side. Specifically, the handle 52 includes a substantially cylindrical attachment portion 52A which is formed with the left and right direction as the axial direction and a grip portion 52B which extends in the vertical direction from the outer end portion of the attachment portion 52A in the left and right direction. Further, the handle 52 is divided into two parts in the left and right direction at the portion of the grip portion 52B and includes two members. Specifically, the handle 52 includes a handle main body 53 which constitutes the inner portion of the handle 52 in the left and right direction and a handle cover 54 which constitutes the outer portion of the handle 52 in the left and right direction. Then, the handle fixing portion 32G of the end bracket 32 is inserted into the attachment portion 52A and the handle main body 53 is fastened and fixed to the end bracket 32. After the handle main body 53 is fixed to the end bracket 32, the handle cover 54 is fastened and fixed to the handle main body 53 by a screw. In the case of this embodiment, the distance W (FIG. 1) from the right end position of the right handle 52 to the left end position of the left handle 52 is 275 mm. Further, the vertical length Ha1 (FIG. 1) of the handle 52 itself is 96 mm and the length Ha2 (FIG. 1) from the center position of the handle fixing portion 32G to the upper end position of the handle 52 is 55 mm.

In the right handle 52, a switch button 55 is provided at the upper portion to be pressed and a trigger 56 is provided at the rear portion to be pulled. Further, a switch circuit unit 57 which is operated by the operation of the switch button 55 and the trigger 56 is provided inside the right handle 52 and the switch circuit unit 57 is fixed to the handle main body 53. The switch circuit unit 57 includes a switch (not shown) operated by the switch button 55 and the trigger 56. The switch is electrically connected to the control unit 80 to be described later and an output signal according to the operation state of the switch button 55 and the trigger 56 is output to the control unit 80 to be described later.

(Battery Holder 60)

As shown in FIGS. 1 to 7, the battery holder 60 is provided on the upper side of the motor housing 33 and is formed in a substantially box shape that is opened downward. The battery holder 60 is divided into two parts in the front and rear direction. That is, the battery holder 60 includes a front holder 62 serving as a "holder member" constituting the front portion of the battery holder 60 and a rear holder 64 serving as a "holder member" constituting the rear portion of the battery holder 60. The front holder 62 and the rear holder 64 are formed of resin.

Figure 7:
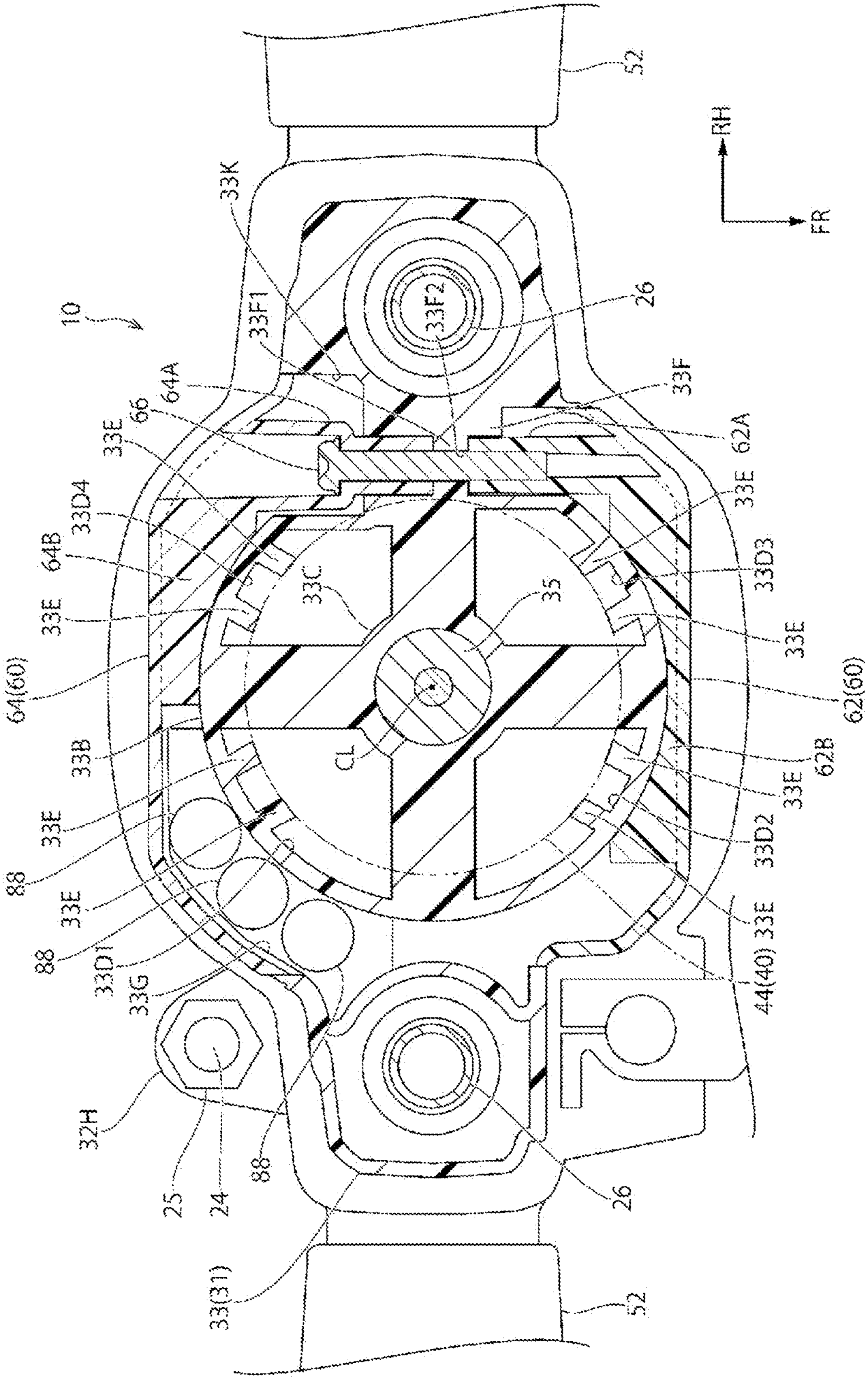
FIG. 7 is a cross-sectional view showing a fixing state between the motor housing and the battery holder shown in FIG. 5 when viewed from above (a cross-sectional view taken along the line 7-7 of FIG. 5).
Figure 8:
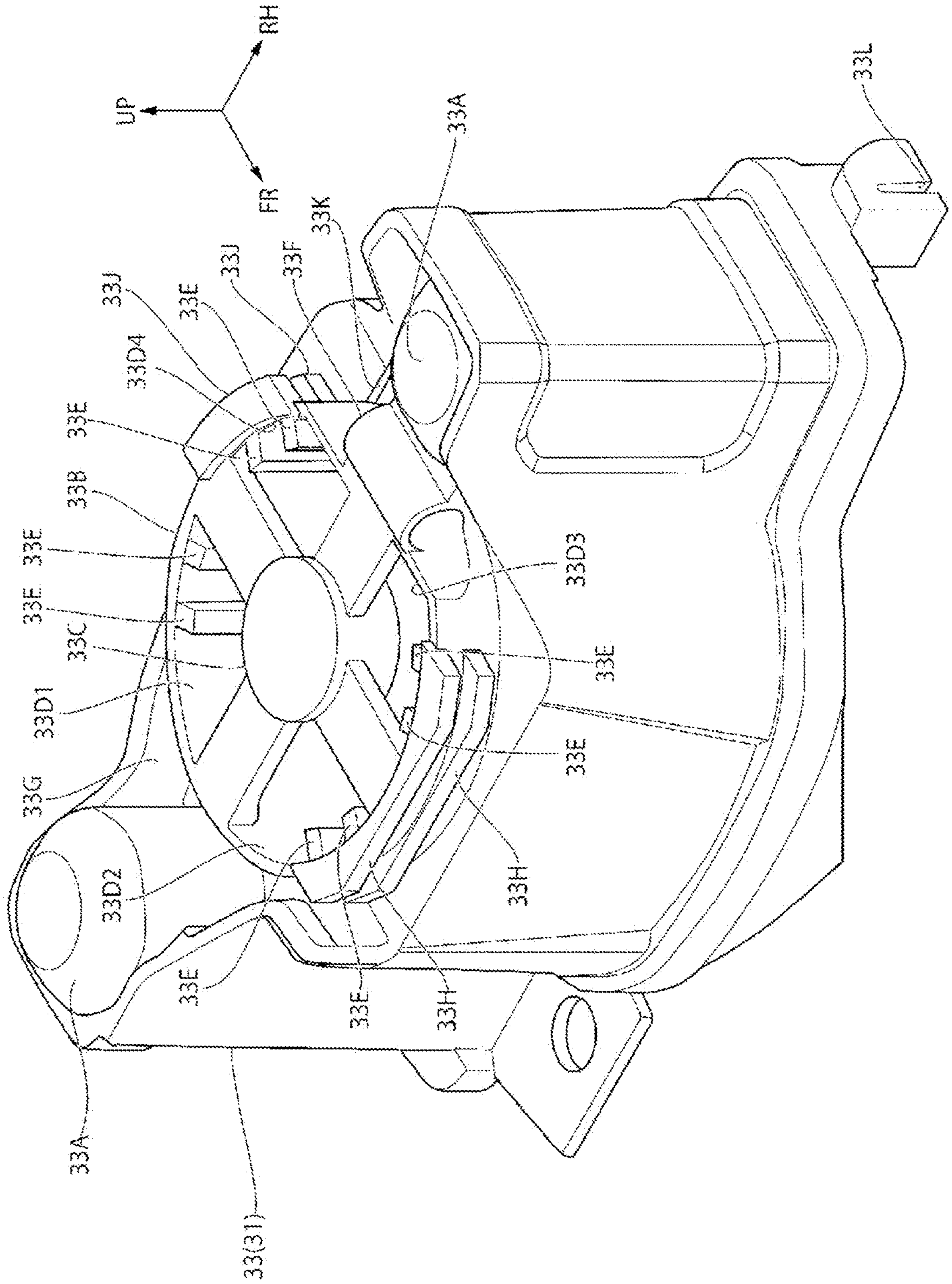
FIG. 8 is a perspective view showing the motor housing shown in FIG. 1 when viewed from the rightward inclined front side.

As shown in FIG. 7, a fixing boss 62A is formed at a position corresponding to the housing side fixing portion 33F of the motor housing 33 at the lower end portion of the front wall of the front holder 62. The fixing boss 62A is formed in a substantially cylindrical shape with the front and rear direction as the axial direction and protrudes backward from the front wall of the front holder 62. Then, the front end portion (the rear end portion) of the fixing boss 62A is inserted into the front opening portion of the housing side fixing portion 33F and is disposed adjacently on the front side of the fixing wall 33F1.

Further, a fixed cylinder portion 64A is formed at a position corresponding to the housing side fixing portion 33F at the lower end portion of the rear wall of the rear holder 64. The fixed cylinder portion 64A is formed in a substantially stepped cylindrical shape that is opened backward and protrudes forward from the rear wall of the rear holder 64. Specifically, the radial dimension of the front portion of the fixed cylinder portion 64A is set to be smaller than the radial dimension of the rear portion of the fixed cylinder portion 64A and the inside of the fixed cylinder portion 64A is penetrated in the front and rear direction. Further, the front portion of the fixed cylinder portion 64A is inserted into the rear opening portion of the housing side fixing portion 33F of the motor housing 33 and is disposed adjacently on the rear side of the fixing wall 33F1. Then, the fixing screw 66 (in a broad sense, an element grasped as a "fixing member") is inserted into the fixed cylinder portion 64A from the rear side, is inserted through the fixing hole 33F2 of the motor housing 33, and is screwed into the inner peripheral surface of the fixing boss 62A. Accordingly, the front holder 62 and the rear holder 64 are fixed to the motor housing 33 to sandwich the motor housing 33 on the front and rear sides by the fixing screw 66. Thus, the front holder 62 and the rear holder 64 are fixed to the motor housing 33 on the outer side of the upper end portion of the motor 40 (the rotation shaft 41) in the radial direction.

As shown in FIGS. 6 and 7, three holder side engagement ribs 62B serving as "engaged portions" are formed at the substantially center portion in the left and right direction at the lower end portion of the front wall of the front holder 62. The holder side engagement ribs 62B are arranged at predetermined intervals in the vertical direction with the vertical direction as the plate thickness direction. Then, the housing side engagement rib 33H of the motor housing 33 is inserted between the holder side engagement ribs 62B and the housing side engagement rib 33H and the holder side engagement rib 62B engage with each other in the vertical direction. Accordingly, the lower end portion of the front holder 62 engages with the motor housing 33 on the outer side of the upper end portion of the motor 40 (the rotation shaft 41) in the radial direction so that the movement of the lower end portion of the front holder 62 in the vertical direction is restricted.

Three holder side engagement ribs 64B serving as "engaged portions" are formed at the right portion of the lower end portion of the rear wall of the rear holder 64. The holder side engagement ribs 64B are arranged at predetermined intervals in the vertical direction with the vertical direction as the plate thickness direction. Then, the housing side engagement rib 33J of the motor housing 33 is inserted between the holder side engagement ribs 64B and the housing side engagement rib 33J and the holder side engagement rib 64B engage with each other in the vertical direction. Accordingly, the lower end portion of the rear holder 64 engages with the motor housing 33 on the outer side of the upper end portion of the motor 40 (the rotation shaft 41) in the radial direction so that the movement of the lower end portion of the rear holder 64 is restricted in the vertical direction.

As shown in FIGS. 1, 3, and 6, two first intake holes 62C are formed at the intermediate portion in the left and right direction and on the upper side of the holder side engagement rib 62B in the front wall of the front holder 62. Two first intake holes 62C are arranged side by side in the left and right direction and are formed in an elongated hole shape extending in the left and right direction. Then, the first intake hole 62C is disposed on the upward inclined front side of the motor accommodation portion 33B of the motor housing 33. Further, the length of the left first intake hole 62C in the longitudinal direction is set to be shorter than the length of the right first intake hole 62C in the longitudinal direction.

As shown in FIGS. 3 and 6, two first intake holes 64C extending in the left and right direction are formed in the rear wall of the rear holder 64 similarly to the front holder 62. That is, the first intake hole 64C is formed at the intermediate portion of the rear wall of the rear holder 64 in the left and right direction and on the upper side of the holder side engagement rib 64B. Further, two first intake holes 64C are arranged side by side in the left and right direction, are formed in an elongated hole shape extending in the left and right direction, and are arranged on the upward inclined rear side of the motor accommodation portion 33B of the motor housing 33. Further, the length of the left first intake hole 64C in the longitudinal direction is set to be shorter than the length of the right first intake hole 64C in the longitudinal direction.

Then, an air flow AR1 (see FIG. 6) flowing from the first intake hole 62C (the first intake hole 64C) into the battery holder 60 is allowed to flow into the communication holes 33D1 to 33D4 of the motor accommodation portion 33B.

As shown in FIG. 4, a battery attachment portion 60A for attaching the battery 70 to be described later thereto is formed at the right portion of the upper end portion of the battery holder 60. The battery attachment portion 60A is formed in a substantially U shape that is opened leftward in a plan view. Further, the battery holder 60 is provided with a battery connector 68 and the upper portion of the battery connector 68 is exposed inside the battery attachment portion 60A to be connectable to the battery 70 to be described later. In order to locate the center position of the battery 70 on the center line CL, the center position of the battery connector 68 is positioned on the right side of the center line CL. Thus, a wiring (not shown) from the battery connector 68 is connected to a control board 82 or the motor 40 through the right side region of the battery holder 60. At this time, it is possible to widen the right region inside the battery holder 60 by lowering the upper end position of the raised portion 33AR located on the right side as compared with the left raised portion 33AL as described above. Accordingly, since it is possible to ensure the wiring space on the right side of a substrate holder 84 to be described later, it is not necessary to provide the wiring space in the vertical space of the substrate holder 84. Accordingly, it is possible to ensure stability by reducing the height H of the router 10. This can be realized by configuring the battery 70 which is a slide attachment/detachment type and will be described later so that the battery is mounted on the battery holder 60 from the left side to the right side.

Further, a second intake hole 60B serving as a "holder side intake hole" is formed on the left side of the battery connector 68 in the upper wall of the battery holder 60. The second intake hole 60B is formed in an elongated hole shape extending in the left and right direction and is disposed at the center portion of the battery holder 60 in the left and right direction. That is, the second intake hole 60B is formed to straddle the front holder 62 and the rear holder 64.

(Battery 70)

As shown in FIGS. 1 to 3 and 5, the battery 70 is formed in a substantially rectangular parallelepiped shape. Then, the battery 70 is mounted on the battery attachment portion 60A of the battery holder 60 from the left side. That is, the battery 70 is attachable to and detachable from the battery holder 60 in the left and right direction. The battery 70 includes a connector (not shown) and in a state in which the battery 70 is mounted on the battery attachment portion 60A, the connector is connected to the battery connector 68 and electric power is supplied to the control unit 80 to be described later. Further, the battery 70 includes a pair of lock members 72 and the lock member 72 is provided at the front and rear side portions of the battery 70. Then, in a state in which the battery 70 is mounted on the battery attachment portion 60A, the lock member 72 engages with the battery holder 60 and the mounting state of the battery 70 is maintained. By operating the lock member 72, the battery 70 can be separated from the battery holder 60 in the left direction.

A plurality of (in the embodiment, eight) battery side intake holes 70A is formed at the substantially center portion of the right wall of the battery 70 to penetrate the right wall. The battery side intake hole 70A is formed in an elongated hole shape with the front and rear direction as the longitudinal direction. Then, two sets of battery side intake holes 70A are arranged side by side in the left and right direction, with four battery side intake holes 70A lined up in the vertical direction as one set.

Further, a plurality of (in this embodiment, eight) battery side exhaust holes 70B (see FIGS. 3 and 5) is formed at the left portion of the lower wall of the battery 70 to penetrate the lower wall. The battery side exhaust holes 70B are formed in an elongated hole shape with the left and right direction as the longitudinal direction and are arranged side by side in the front and rear direction. Further, the battery side exhaust hole 70B is disposed on the upper side of the second intake hole 60B of the battery holder 60 and the battery side exhaust hole 70B and the second intake hole 60B are arranged to face each other in the vertical direction. Accordingly, when the fan 47 rotates, an air flow AR3 (see FIG. 5) flowing from the battery side intake hole 70A of the battery 70 into the battery 70 passes through the battery side exhaust hole 70B of the battery 70 and the second intake hole 60B of the battery holder 60 and flows into the battery holder 60. Then, the air flow AR3 flowing into the battery holder 60 is allowed to flow from the communication holes 33D1 to 33D4 of the motor housing 33 into the motor housing 33.

(Control Unit 80)

Figure 9:
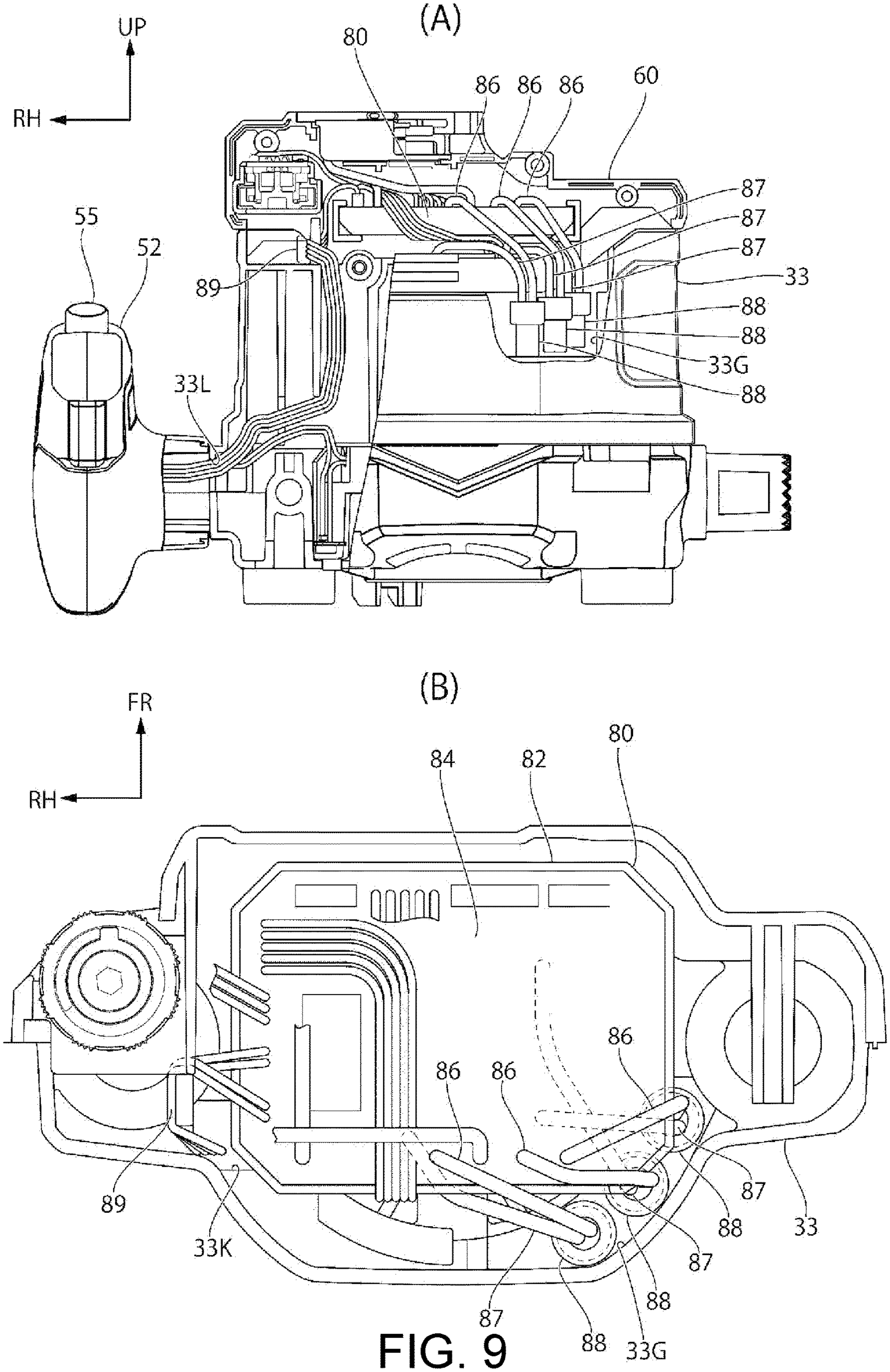
In FIG. 9, (A) is a partially broken explanatory diagram illustrating a wiring state of a lead wire extending from a control board shown in FIG. 6 when viewed from the rear side and (B) is an explanatory diagram illustrating the wiring state of the lead wire extending from the control board when viewed from above.

As shown in FIGS. 5, 6, and (A) and (B) of FIG. 9, the control unit 80 includes the control board 82. The control board 82 is formed in a substantially rectangular shape with the vertical direction as the plate thickness direction and the left and right direction as the longitudinal direction. Further, the control board 82 is held in the substrate holder 84 and the substrate holder 84 is accommodated in the battery holder 60 to be fixed to the battery holder 60. Specifically, the control unit 80 is disposed adjacently on the upper side of the motor accommodation portion 33B of the motor housing 33. That is, the housing side fixing portion 33F of the motor housing 33 and the fixing boss 62A and the fixed cylinder portion 64A of the battery holder 60 are arranged on the outer side of the motor 40 in the radial direction and the lower side of the control unit 80. Further, the control unit 80 is disposed on the rear side of the first intake hole 62C (a guide portion 62D) and the front side of (a guide portion 64D) of the first intake hole 64C. Accordingly, an air flow AR2 flowing from the first intake hole 62C (the first intake hole 64C) into the battery holder 60 and diverted by the guide portion 62D (the guide portion 64D) is allowed to flow toward the upper side of the control unit 80 (the control board 82).

Further, the control board 82 is connected to the battery connector 68 and electric power of the battery 70 is supplied to the control board 82. As shown in (B) of FIG. 9, a lead wire 86 serving as a "power line" extends to the control board 82 and the lead wire 86 is connected to a motor wire 87 extending from the motor substrate 40A of the motor 40 via a connector 88. Accordingly, electric power is supplied from the battery 70 to the motor 40. The connector 88 is formed in a substantially columnar shape with the vertical direction as the axial direction and is accommodated in the connector accommodation portion 33G of the motor housing 33. Accordingly, the connector 88 is disposed on the outer side of the motor 40 in the radial direction behind the rotation shaft 41. Additionally, the motor wire 87 extending from the motor substrate 40A is inserted through the communication hole 33D1 of the motor accommodation portion 33B and is extended into the connector accommodation portion 33G. Further, as shown in (B) of FIG. 9, a part of the connector 88 accommodated in the connector accommodation portion 33G and a part of the control unit 80 (the substrate holder 84) overlap with each other in the vertical direction. Accordingly, since the control unit 80 regulates the upward movement of the connector 88, it is possible to suppress the connector 88 from being separated from the connector accommodation portion 33G. That is, the control unit 80 can be used to position the connector 88.

Further, a lead wire 89 extending from the control board 82 is connected to the switch circuit unit 57 and the control unit 80 and the switch circuit unit 57 are electrically connected to each other. Specifically, the lead wire 89 is inserted through the wiring hole 33K of the motor housing 33 and disposed inside the motor housing 33 on the outer side of the motor accommodation portion 33B in the radial direction. Further, the lead wire 89 is inserted through the wiring groove 33L of the motor housing 33, is disposed inside the handle 52, and is connected to the switch circuit unit 57. Then, the control unit 80 is configured to control the operation of the motor 40 when the trigger 56 is operated while the switch button 55 is turned on.

(Position of Center of Gravity of Router 10)

Next, the position of the center of gravity of the router 10 at the highest initial position of the router main body 30 will be described with reference to FIGS. 1 and 2. The center of gravity G of the router 10 is located on the center line CL when viewed from the front side. Further, the center of gravity G overlaps with the motor 40 (not shown in FIGS. 1 and 2) and is located between the pair of left and right handles 52 in a front view. Furthermore, the center of gravity G of the router 10 is located slightly on the rear side of the center line CL when viewed from the left and right direction.

Then, an angle A formed between the lower surface of the base 20 and the virtual line IL passing through the center of gravity G and the outer peripheral portion of the lower end portion of the base 20 when viewed from a direction orthogonal to the vertical direction is 80 degrees or less. Specifically, the angle A formed between the lower surface of the base 20 and the virtual line IL passing through the center of gravity G and the outer peripheral portion (the arc-shaped outer peripheral portion 20C) of the lower end portion at each of the left and right ends of the base 20 in a front view is 61 degrees. Further, the angle A formed between the lower surface of the base 20 and the virtual line IL passing through the center of gravity G and the outer peripheral portion (the linear outer peripheral portion 20B) of the lower end portion at the front end of the base 20 in a side view is 69 degrees. On the other hand, the angle A formed between the lower surface of the base 20 and the virtual line IL passing through the center of gravity G and the outer peripheral portion (the arc-shaped outer peripheral portion 20C) of the lower end portion at the rear end of the base 20 in a side view is 62 degrees. Further, the distance from the center position of the handle fixing portion 32G to the center of gravity in the vertical direction is 25 mm and is set to be smaller than the length Ha2 from the center position of the handle fixing portion 32G to the upper end position of the handle 52.

Figure 10:
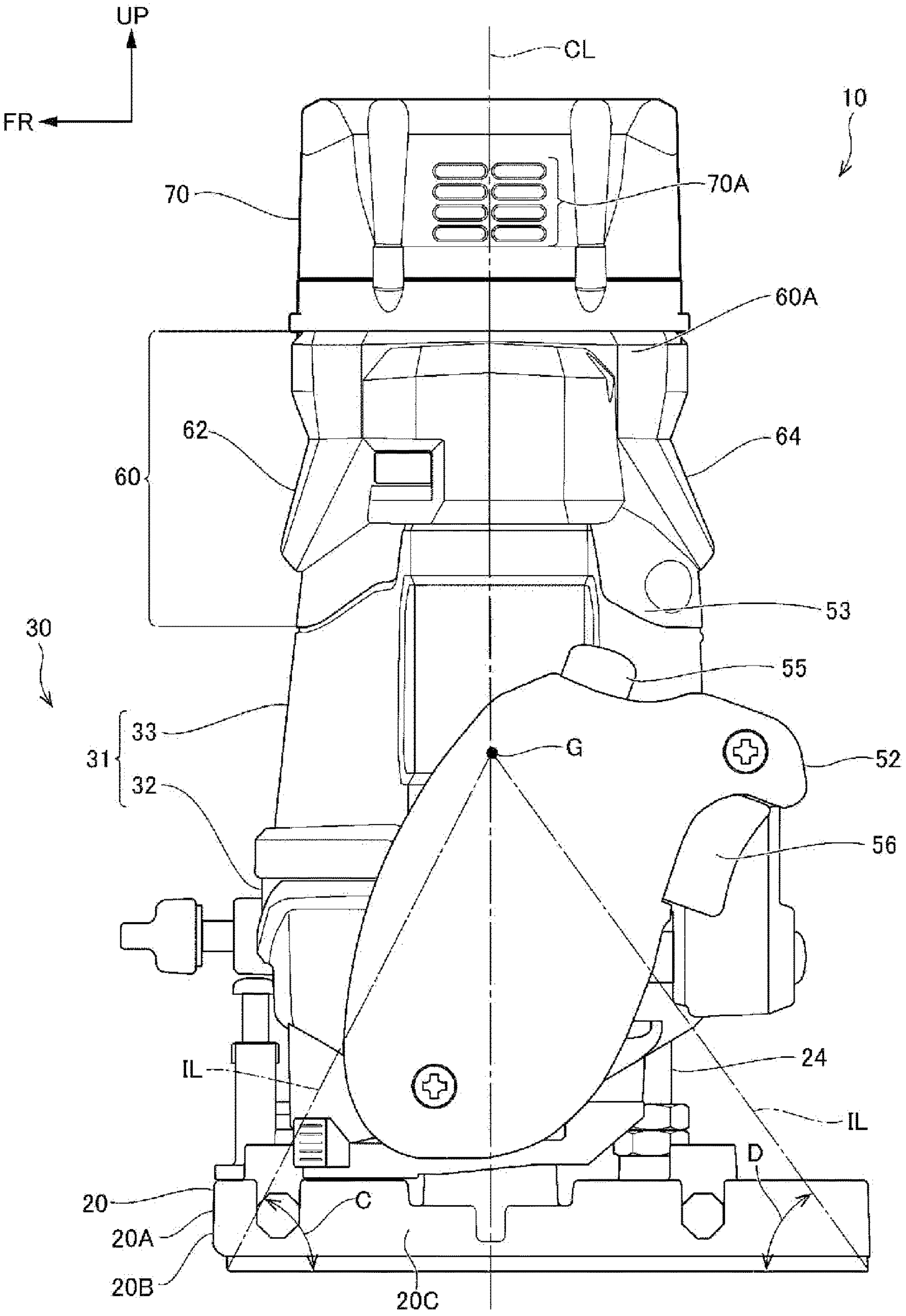
FIG. 10 is a side view showing a state in which a router main body shown in FIG. 2 is disposed at the lowest position.

Additionally, the position of the center of gravity of the router 10 at the lowest position of the router main body 30 is below the position of the center of gravity of the router 10 at the highest initial position of the router main body 30 (FIG. 10). Therefore, an angle (A, B, C, D) formed between the lower surface of the base 20 and the virtual line IL passing through the center of gravity G and the outer peripheral portion of the lower end portion of the base 20 when viewed from a direction orthogonal to the vertical direction at the lowest position of the router main body 30 is 80 degrees or less. In particular, it is important to set the angle C, which is the obtuse angle, to 80 degrees or less.

(Operation and Effect)

Next, the operation and effect of the router 10 of this embodiment will be described.

In the router 10 with the above-described configuration, the battery holder 60 is provided on the upper side of the motor housing 33 and the battery 70 is mounted on the battery holder 60 in an attachable/detachable manner. Therefore, it is possible to drive the motor 40 by supplying electric power from the battery 70 to the motor 40. Accordingly, the convenience can be improved as compared with, for example, a router having a configuration in which a power cord is extended from the router main body 30.

Further, the battery 70 is mounted on the battery holder 60 and constitutes the upper end portion of the router 10. Therefore, the position of the center of gravity G of the router 10 tends to be located on the upper side due to the weight of the battery 70. Accordingly, there is a possibility that the stability of the posture of the router 10 decreases and the router 10 is more likely to be tilted. Specifically, since the position of the center of gravity G of the router 10 at the highest initial position of the router main body 30 becomes the highest, there is a possibility that the posture of the router 10 in this state becomes unstable.

Here, all angles A, B, C, and D formed between the lower surface of the base 20 and the virtual line IL passing through the center of gravity G of the router 10 and the outer peripheral lower end portion of the base 20 when viewed from a direction orthogonal to the vertical direction are set to 80 degrees or less. Specifically, the angle (A, B) formed between the lower surface of the base 20 and the virtual line IL in a front view at the highest initial position of the router main body 30 is 61 degrees. Further, the angle C which is an obtuse angle formed between the lower surface of the base 20 and the virtual line IL passing through the center of gravity G and the outer peripheral portion (the linear outer peripheral portion 20B) of the lower end portion at the front end of the base 20 in a side view at the highest initial position of the router main body 30 is 69 degrees. Further, the angle D formed between the lower surface of the base 20 and the virtual line IL passing through the center of gravity G and the outer peripheral portion (the arc-shaped outer peripheral portion 20C) of the lower end portion at the rear end of the base 20 in a side view at the highest initial position of the router main body 30 is 62 degrees. Therefore, for example, even when the router 10 is tilted from the outer peripheral lower end portion of the base 20, the posture of the router 10 can be returned to the state before tilting when the tilt angle of the router 10 is smaller than 10 degrees. Accordingly, it is possible to suppress a deterioration in the stability of the posture of the router 10. Further, even when the upper surface of the workpiece W itself below the base 20 is tilted during the work, stable work can be performed. Additionally, in this embodiment, in order to realize more preferable stability, the router 10 is configured not to tip over even if the tilt angle of the router 10 reaches 25 degrees.

Further, the center of gravity G of the router 10 is disposed between the pair of left and right handles 52 in a front view and is disposed at a position overlapping with the handle 52 when viewed from the left and right direction. Accordingly, it is possible to stabilize the posture of the router 10, for example, when the operator grips the handle 52 and lifts the router 10. That is, if the operator grips the handle 52 and lifts the router 10 when the center of gravity G of the router 10 is disposed above the handle 52, the rotational moment that tends to tilt forward or backward may act on the router 10. Accordingly, it is necessary for the operator to grip the handle 52 not to rotate the router 10 when the router 10 is lifted. As a result, since the force for the operator to grip the handle 52 increases, there is a possibility that the burden on the operator increases.

On the other hand, in this embodiment, the center of gravity G of the router 10 is disposed at a position overlapping with the handle 52 when viewed from the left and right direction. Therefore, even when the operator grips the handle 52 and lifts the router 10, the rotational moment that tends to tilt to the front side or the rear side is less likely to act on the router 10 as compared with the above case. Accordingly, it is possible to stabilize the posture of the router 10 when the operator grips the handle 52 and lifts the router 10 as compared with the above case. As a result, it is possible to reduce the burden on the operator.

Further, the main body housing 31 includes the metallic end bracket 32 which constitutes the lower portion of the main body housing 31 and the resinous motor housing 33 which constitutes the upper portion of the main body housing 31. Further, the battery holder 60 is formed of resin and is provided on the upper side of the motor housing 33. Accordingly, it is possible to lower the vertical position of the center of gravity G of the router 10 as compared with, for example, a case in which the motor housing 33 and the battery holder 60 are formed of metal or the end bracket 32 is formed of resin. Thus, it is possible to further improve the stability in the posture of the router 10.

Further, the lead wire 86 supplying electric power from the battery 70 to the motor 40 and the motor wire 87 extending from the motor substrate 40A of the motor 40 are connected to each other by the connector 88 and the connector 88 is accommodated in the connector accommodation portion 33G of the motor housing 33 and is disposed on the outer side of the motor 40 in the radial direction. That is, the connector 88 and the motor 40 can be arranged at the same position in the vertical direction. Accordingly, it is possible to set the position of the battery 70 in the vertical direction to be low as compared with a configuration in which the connector 88 is disposed between the battery 70 and the motor 40. Specifically, in this embodiment, the height H of the router 10 in the vertical direction at the highest initial position can be set to 280 mm to be smaller than 300 mm. As a result, the position of the center of gravity G of the router 10 can be lowered and closer to the base 20. Accordingly, it is possible to further stabilize the posture of the router 10.

Further, the base 20 is formed in a disk shape having the notch portion 20A extending in the left and right direction at the front end portion. Specifically, the outer peripheral portion of the base 20 includes the linear outer peripheral portion 20B which constitutes the front end portion of the outer peripheral portion of the base 20 and the arc-shaped outer peripheral portion 20C which is curved in an arc shape to protrude backward. Accordingly, the distance L from the center line CL to the outer peripheral portion of the base 20 in a plan view becomes the shortest at the center portion of the linear outer peripheral portion 20B in the left and right direction. Further, as described above, the angle formed between the virtual line IL and the lower surface of the base 20 becomes maximal (the angle C) at the center portion of the linear outer peripheral portion 20B in the left and right direction. Therefore, the router 10 is configured to be easily tilted forward.

Here, the connector 88 is disposed on the rear side with respect to the rotation shaft 41 of the motor 40. Accordingly, the position of the center of gravity G can be set to the rear side as compared with a configuration in which the connector 88 is disposed on the front side with respect to the rotation shaft 41. As a result, it is possible to suppress the router 10 from being tilted forward. Thus, it is possible to effectively improve the stability in the posture of the router 10.

Further, the battery holder 60 is divided into two parts in the front and rear direction and includes the front holder 62 and the rear holder 64. Further, the motor housing 33 is provided with the housing side fixing portion 33F for fixing the front holder 62 and the rear holder 64 and the housing side fixing portion 33F is disposed on the outer side of the upper end portion of the motor 40 (the rotation shaft 41) in the radial direction. That is, the housing side fixing portion 33F and the motor 40 (the rotation shaft 41) can be arranged at the same position in the vertical direction. Accordingly, it is possible to set the position of the battery 70 in the vertical direction to be low as compared with a configuration in which the housing side fixing portion 33F is disposed on the upper side of the motor 40. As a result, it is possible to lower the position of the center of gravity G of the router 10. Thus, it is possible to further stabilize the posture of the router 10.

Further, the control unit 80 is accommodated in the battery holder 60 and is fixed to the battery holder 60. Further, the control unit 80 is disposed on the upper side of the motor 40 and the housing side fixing portion 33F. In other words, the housing side fixing portion 33F is disposed on the outer side of the motor 40 in the radial direction and the lower side of the control unit 80. Accordingly, it is possible to fix the battery holder 60 to the motor housing 33 by the housing side fixing portion 33F while suppressing the housing side fixing portion 33F from obstructing the vertical space for accommodating the control unit 80 in the battery holder 60. Therefore, it is possible to set the vertical positions of the control unit 80 and the battery 70 to be low as compared with a configuration in which the housing side fixing portion 33F is disposed between the motor 40 and the control unit 80 in the vertical direction. Thus, it is possible to further improve the stability in the posture of the router 10.

Further, the motor accommodation portion 33B of the motor housing 33 is provided with the pair of upper and lower housing side engagement ribs 33H protruding forward and the pair of upper and lower housing side engagement ribs 33J protruding backward. Further, the lower end portion of the front holder 62 of the battery holder 60 is provided with the holder side engagement rib 62B and the lower end portion of the rear holder 64 is provided with the holder side engagement rib 64B. Then, the holder side engagement rib 62B (the holder side engagement rib 64B) engages with the housing side engagement rib 33H (the housing side engagement rib 33J) in the vertical direction and is disposed on the outer side of the upper end portion of the motor 40 (the rotation shaft 41) in the radial direction. That is, the lower end portion of the battery holder 60 engages with the motor accommodation portion 33B on the outer side of the motor 40 in the radial direction. Therefore, it is possible to lower the position of the upper end portion of the motor accommodation portion 33B as compared with a configuration in which the lower end portion of the battery holder 60 engages with the motor accommodation portion 33B on the upper side of the motor 40. That is, it is possible to engage the motor accommodation portion 33B and the battery holder 60 with each other while suppressing the motor accommodation portion 33B from obstructing the vertical space for accommodating the control unit 80 in the battery holder 60. Thus, it is possible to stabilize the posture of the router 10 while satisfactorily maintaining the attachment state of the battery holder 60 with respect to the lower end portion.

Further, the front holder 62 (the rear holder 64) of the battery holder 60 is provided with the first intake hole 62C (the first intake hole 64C). Accordingly, it is possible to cool the motor 40 by the air flow AR1 flowing from the first intake hole 62C (the first intake hole 64C) into the battery holder 60.

Further, the battery 70 is provided with the plurality of battery side intake holes 70A and the plurality of battery side exhaust holes 70B. Then, the battery side exhaust hole 70B is disposed on the upper side of the second intake hole 60B of the battery holder 60 and is disposed to face the second intake hole 60B in the vertical direction. Accordingly, it is possible to generate the air flow AR3 that flows from the battery side intake hole 70A of the battery 70 into the battery 70 by the fan 47. Then, it is possible to allow the air flow AR3 to flow from the battery side exhaust hole 70B of the battery 70 and the second intake hole 60B of the battery holder 60 into the battery holder 60. Thus, even in the configuration in which the battery 70 is mounted on the router 10, it is possible to suppress the generation of heat of the battery 70 by cooling the battery 70. Further, since the battery 70 is disposed at the upper portion of the router 10, it is difficult for the machined powder (chips) generated in the lower portion to approach the battery side intake hole 70A provided in the battery 70 and it is possible to suppress the machined powder from entering the battery 70.

Figure 11:
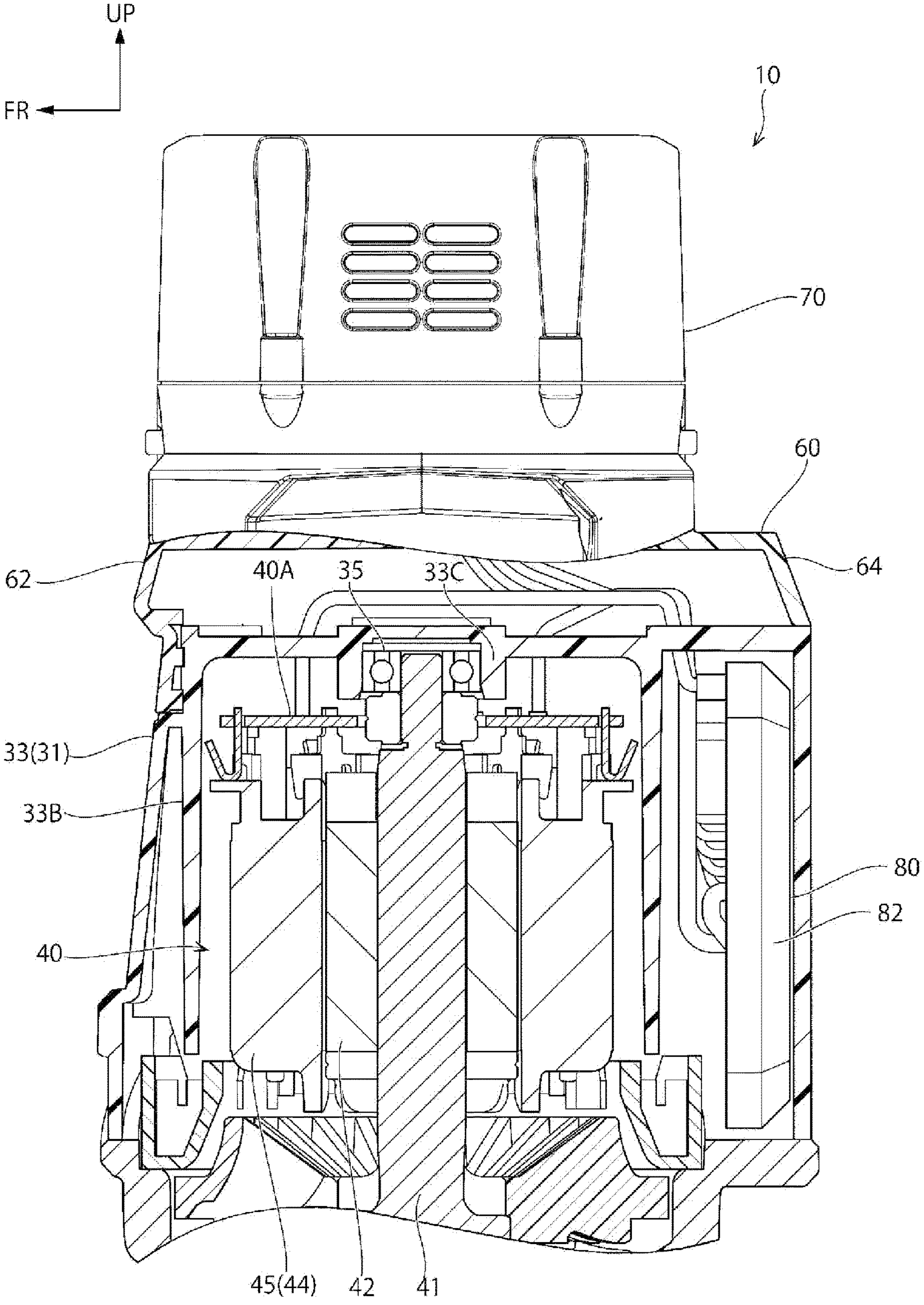
FIG. 11 is a cross-sectional view showing a modified example of an arrangement position of a control unit shown in FIG. 6 when viewed from the right side.

Additionally, in the first embodiment, the control unit 80 is accommodated in the battery holder 60 and is disposed on the upper side of the motor 40. However, as shown in FIG. 11, the control unit 80 may be disposed on the outer side of the motor 40 in the radial direction. In this case, the control board 82 may be disposed with the radial direction of the motor 40 as the plate thickness direction and, for example, the control unit 80 may be attached to the rear portion of the motor housing 33. Then, in this case, since the control unit 80 is disposed on the outer side of the motor 40 in the radial direction, the position of the battery 70 can be set to be lower than that of the first embodiment. Thus, it is possible to more effectively improve the stability in the posture of the router 10.

Second Embodiment

Hereinafter, a router 100 according to a second embodiment will be described with reference to FIGS. 12 to 20. The router 100 of the second embodiment has the same configuration as that of the router 10 of the first embodiment except for the following points. Additionally, in FIGS. 12 to 20, the same reference numerals are given to the same parts as those of the first embodiment.

That is, in the second embodiment, a battery holder 110 serving as a "battery holder" is provided on the upper side of the motor housing 33 instead of the battery holder 60. The battery holder 110 is divided into two parts and includes a left holder 112 which constitutes the left portion of the battery holder 110 and a right holder 114 which constitutes the right portion of the battery holder 110. Then, the battery holder 110 is configured by assembling the left holder 112 and the right holder 114. The motor housing 33 has a single piece structure that cannot be divided.

Figure 19:
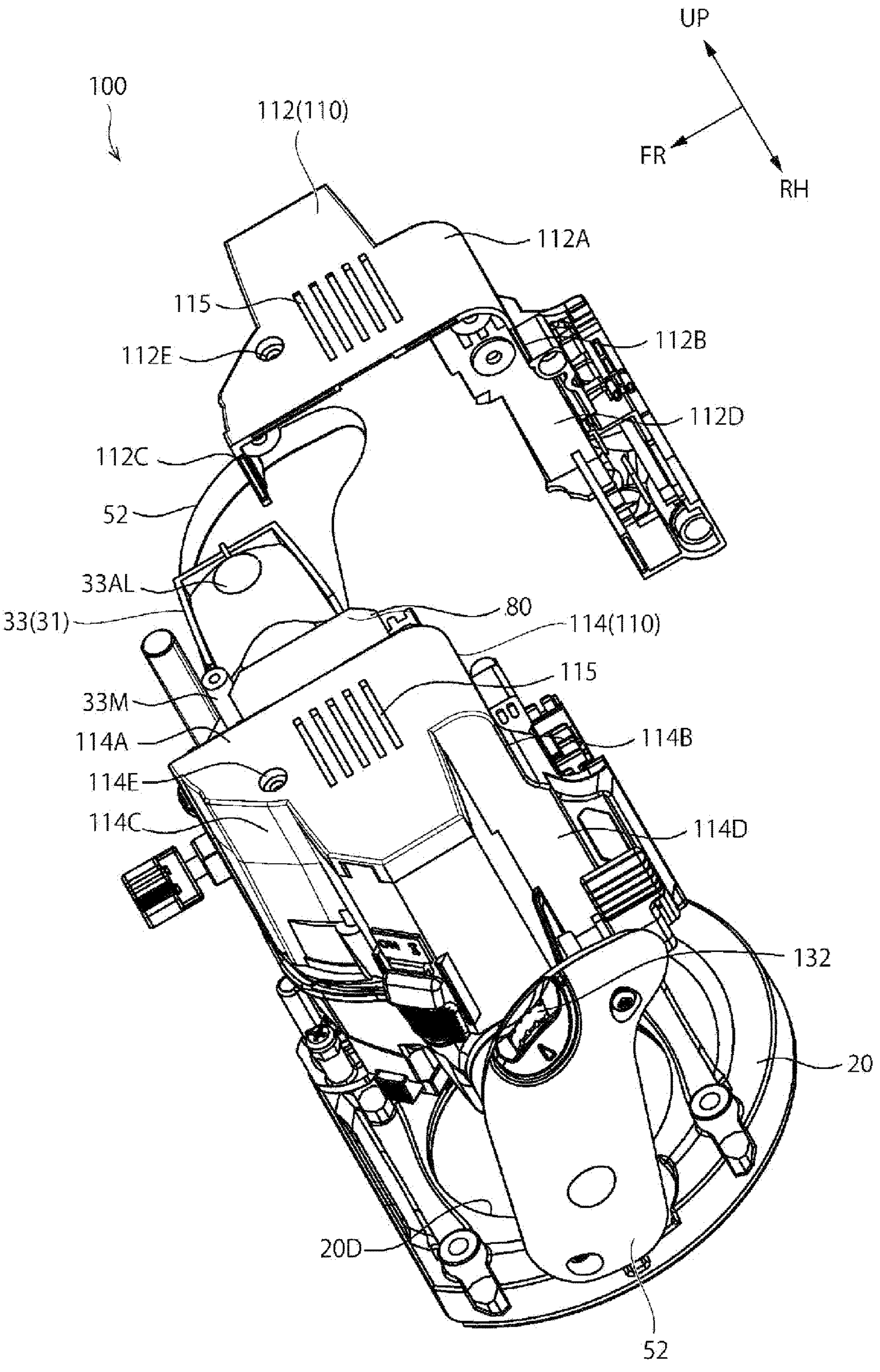
FIG. 19 is a perspective view showing a state in which a left holder of a battery holder is separated.
Figure 20:
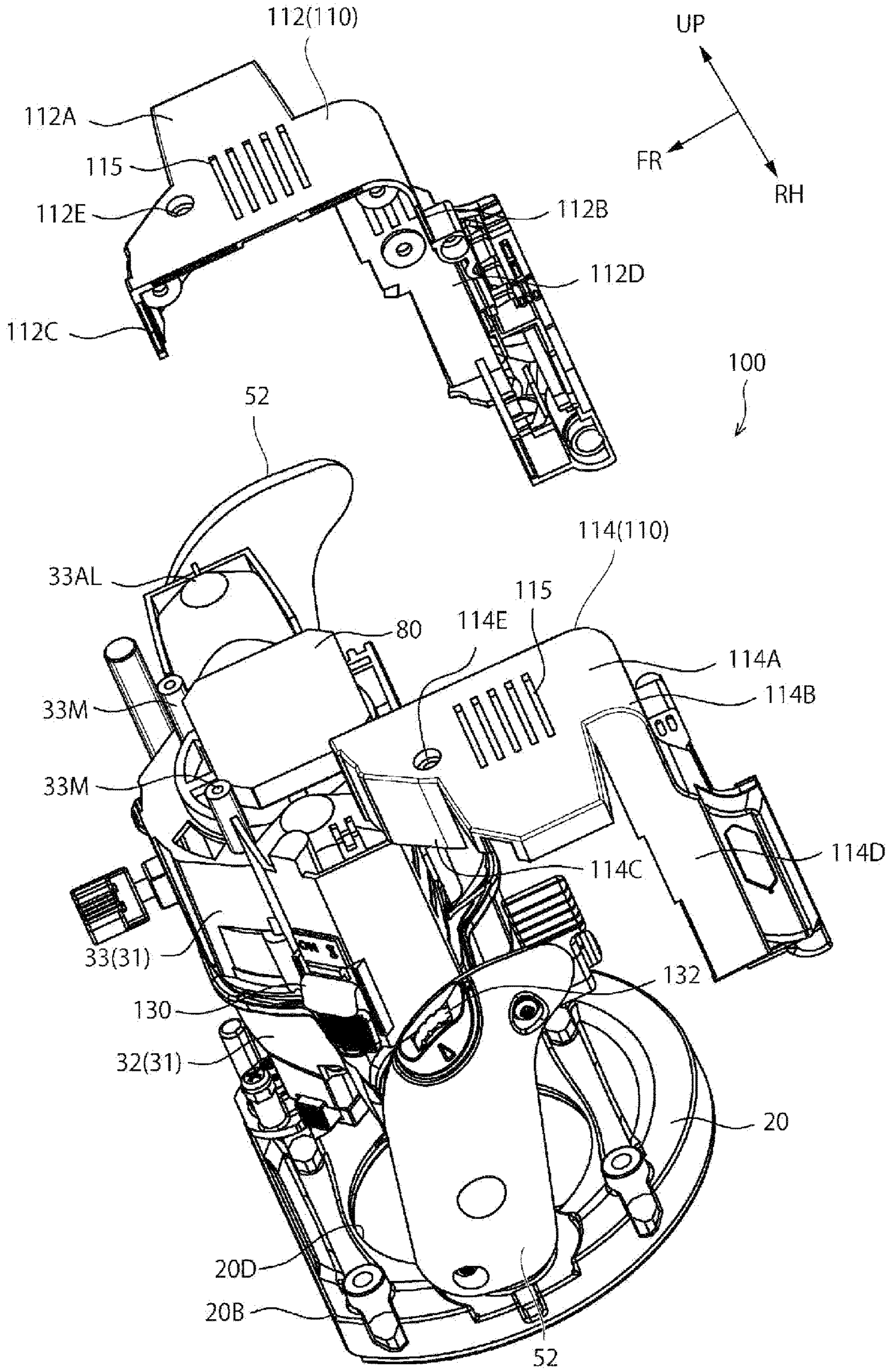
FIG. 20 is a perspective view showing a state in which the left holder and a right holder of the battery holder are separated.

The left holder 112 and the right holder 114 include outer top wall portions 112A and 114A which cover the upper wall of the motor housing 33 and the raised portions 33AR and 33AL. As shown in FIGS. 19 and 20, rear surface wall portions 112B and 114B are connected to the outer top wall portions 112A and 114A. The rear surface wall portions 112B and 114B are respectively integrally formed with the outer top wall portions 112A and 114A and extend along the rear surface portion of the motor housing 33 from the outer top wall portions 112A and 114A. The outer top wall portion 112A is a first outer top wall portion which covers the left portion of the upper wall of the motor housing 33 and the outer top wall portion 114A is a second outer top wall portion which covers the right portion of the upper wall of the motor housing 33. The rear surface wall portion 112B is a first rear surface wall portion and the rear surface wall portion 114B is a second rear surface wall portion.

The left holder 112 and the right holder 114 respectively include abutting portions 112C and 114C that are abutted against the opening end of the base end portion of the motor housing 33, side wall portions 112D and 114D are integrally provided on the side edges of the rear surface wall portions 112B and 114B, and the side wall portions 112D and 114D are abutted against the rear surface of the motor housing 33.

Figure 12:
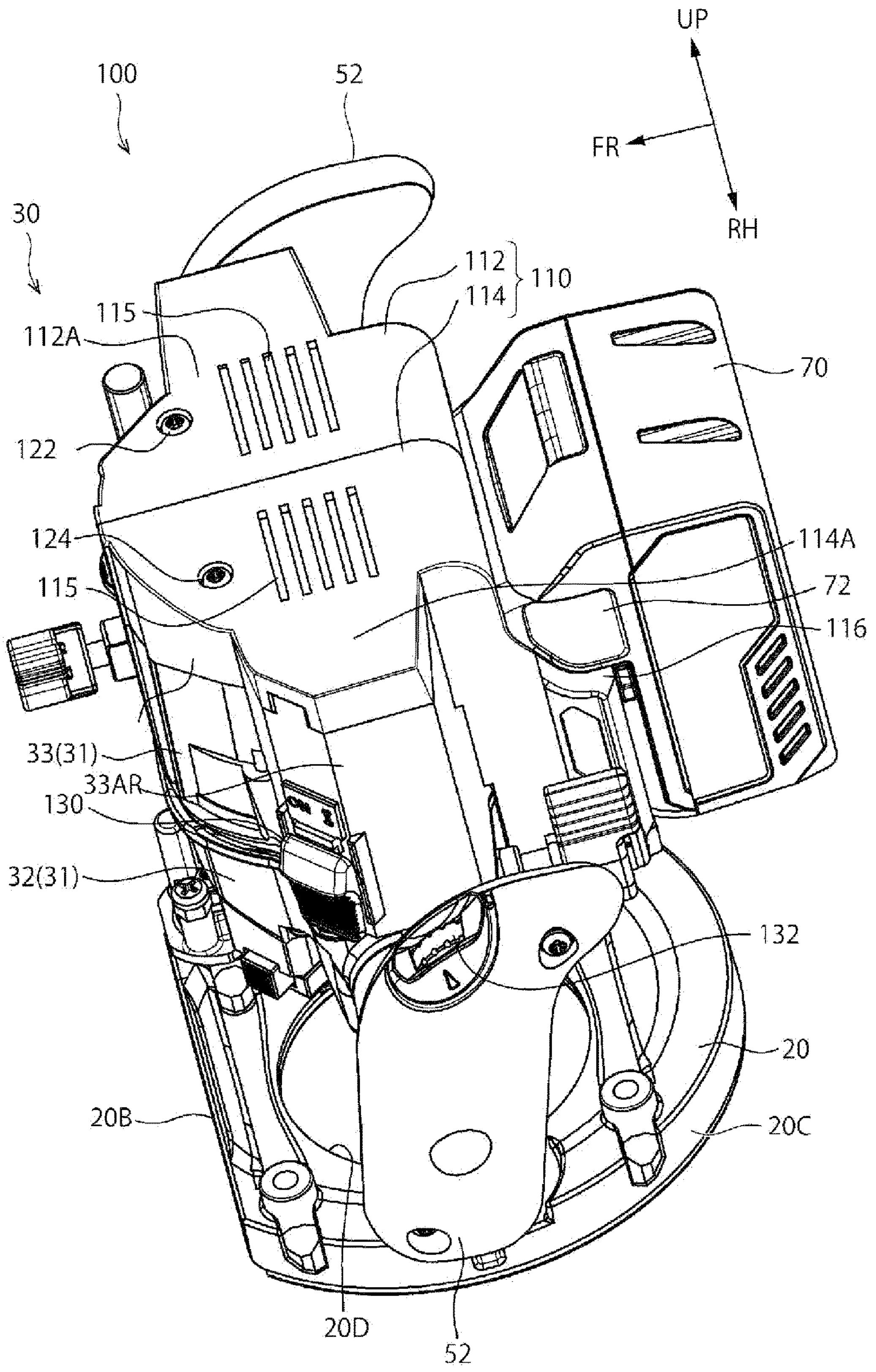
FIG. 12 is a perspective view showing a router according to a second embodiment.

As shown in FIG. 12, two left and right holders 112 and 114 are abutted at the abutting ends, respectively, to assemble the battery holder 110. One of the abutting ends is provided with a convex portion and the other of them is provided with a concave portion engaging with the convex portion. By the meshing between the convex portion and the concave portion, the misalignment of the left holder 112 and the right holder 114 which are assembled to each other is prevented. The left holder 112 is screwed to the motor housing 33 by a fixing screw 122 and the right holder 114 is screwed by a fixing screw 124. As shown in FIG. 20, the fixing screws 122 and 124 pass through screw mounting holes 112E and 114E provided in the left holder 112 and the right holder 114 and are screwed to a screw receiving portion 33M provided on the upper wall of the motor housing 33.

Figure 15:
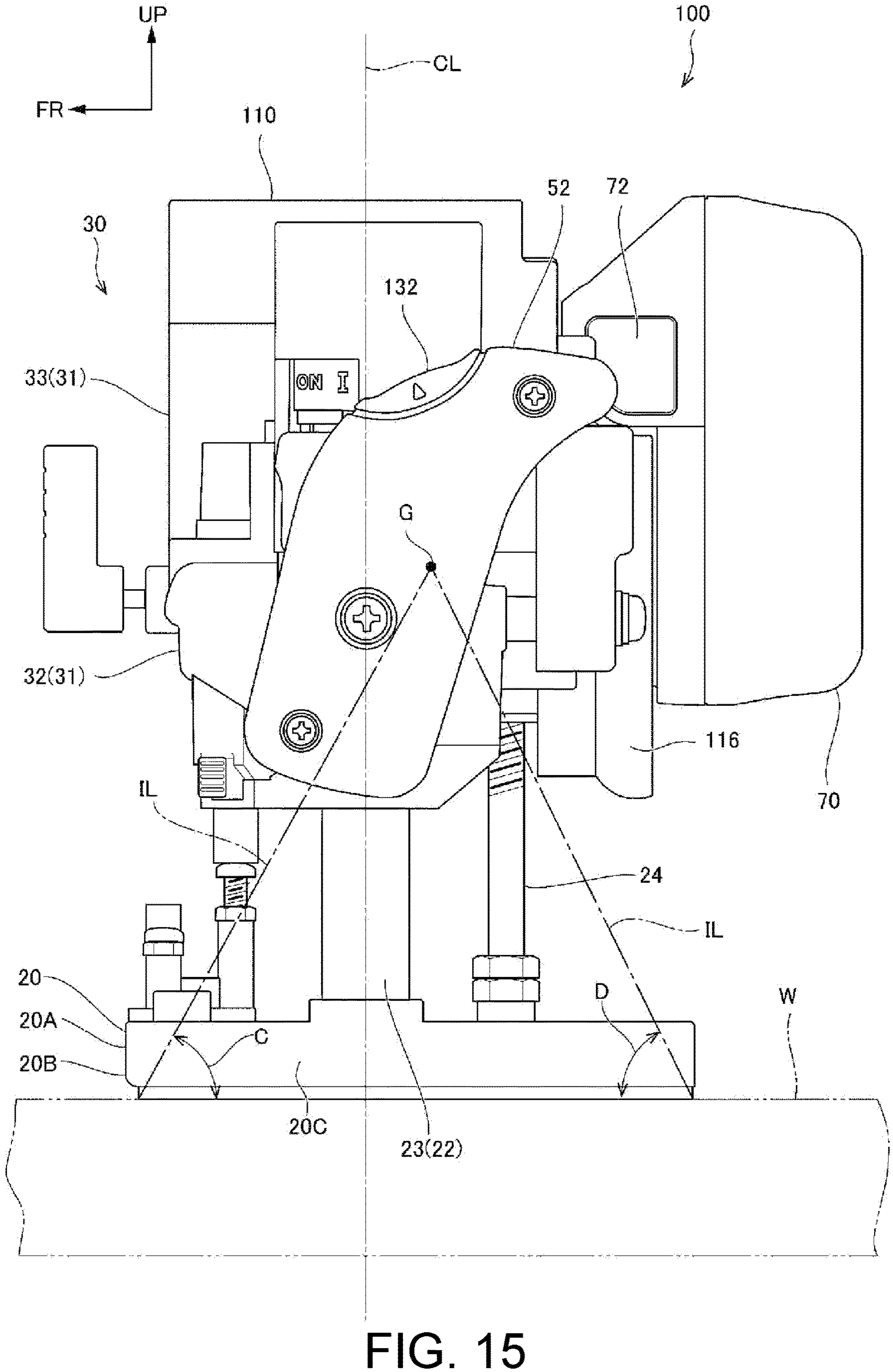
FIG. 15 is a side view showing the router shown in FIG. 12 when viewed from the right side.

The outer top wall portions 112A and 114A are provided with an intake port 115 as shown in FIGS. 15, 19, and 20 and the intake port 115 faces the control unit 80 in the vertical direction. Accordingly, when the fan 47 is rotationally driven, external air flowing from the intake port 115 into the battery holder 110 is blown to the control unit 80.

Figure 16:
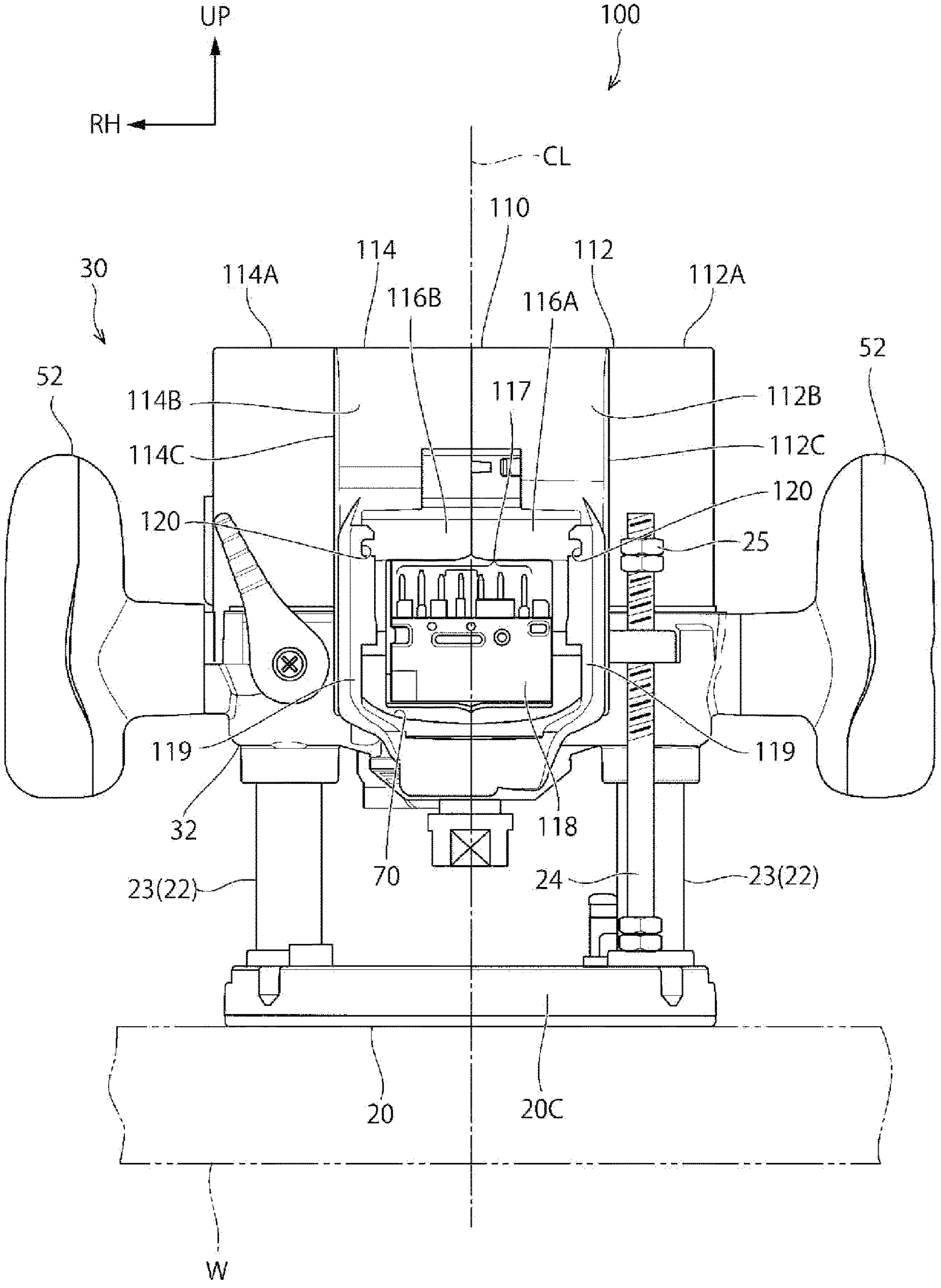
FIG. 16 is a rear view showing the router shown in FIG. 12 in a state in which a battery is separated when viewed from the rear side.

As shown in FIG. 16, the rear surface wall portions 112B and 114B of the left holder 112 and the right holder 114 are respectively provided with battery mounting pieces 116A and 116B. When two left and right holders 112 and 114 are combined with each other, a battery mounting portion 116 can be assembled by both battery mounting pieces 116A and 116B. The battery 70 is mounted on the battery mounting portion 116 in an attachable/detachable manner. The battery mounting portion 116 is provided on the rear surface portion of the router main body 30 (the main body housing 31). Accordingly, in the second embodiment, the battery 70 is disposed behind the router main body 30 and the battery holder 110.

The battery mounting portion 116 is provided with a connection portion 118 including a plurality of device side terminals 117. A guide rail 119 is provided on each of the side edges of the battery mounting pieces 116A and 116B and a slide rail (not shown) engaging with the guide rail 119 is provided in the battery 70. Thus, when the slide rail of the battery 70 is engaged with the guide rail 119 of the battery mounting portion 116 and is slid, the battery 70 is mounted on the battery mounting portion 116. An opening end of the guide rail 119 is provided with an engagement groove 120 and an engagement claw (not shown) engaging with each engagement groove 120 is provided in the battery 70. When each engagement claw engages with the engagement groove 120, the battery 70 is locked to the battery mounting portion 116.

By operating the lock member 72 provided on the side surface of the battery 70, the battery is movable between the position engaging with the engagement groove 120 and the position separating from the engagement groove 120. When performing the attachment/detachment operation of the battery 70, the lock member 72 is operated.

As shown in FIG. 12, the front surface of the motor housing 33 is provided with an operation switch 130 and when the operation switch 130 is operated, an on/off detection signal is sent to the control unit 80. The right handle 52 is provided with a speed setting dial 132 and when the speed setting dial 132 is operated, the operation signal is sent to the control unit 80 and the motor 40 is rotationally driven at the set rotation speed. When the motor 40 is rotationally driven, the fan 47 is also rotationally driven. Accordingly, as shown in FIG. 1, cooling air is introduced from the outside into the battery holder 110 through the plurality of intake ports 115 formed in the battery holder 110 so that the control unit 80 is cooled.

Then, in the second embodiment, since the battery 70 is mounted on the rear surface portion of the router 100, it is possible to shorten the dimension of the router 100 in the longitudinal direction (the vertical direction) as compared with the router 10 of the first embodiment in which the battery 70 is mounted on the upper end of the battery holder 60 and it is possible to improve the workability by the router 100.

(Position of Center of Gravity of Router 100)

Next, the position of the center of gravity of the router 100 at the highest initial position of the router main body 30 will be described with reference to FIGS. 13 and 15. The center of gravity G of the router 100 is located on the center line CL when viewed from the front side. Further, in the second embodiment, since the battery 70 is mounted on the rear surface portion of the router 100, the center of gravity G of the router 100 is located on the rear side of the center line CL when viewed from the left and right direction as compared with the first embodiment.

Then, also in the second embodiment, the angle (A, B, C, D) formed between the lower surface of the base 20 and the virtual line IL passing through the center of gravity G and the outer peripheral portion of the lower end portion of the base 20 when viewed from a direction orthogonal to the vertical direction is 80 degrees or less. Specifically, the angles A and B formed between the lower surface of the base 20 and the virtual line IL passing through the center of gravity G and the outer peripheral portion (the arc-shaped outer peripheral portion 20C) of the lower end portion at each of the left and right ends of the base 20 in a front view are 58 degrees. Further, the angle C formed between the lower surface of the base 20 and the virtual line IL passing through the center of gravity G and the outer peripheral portion (the linear outer peripheral portion 20B) of the lower end portion at the front end of the base 20 in a side view is 63 degrees. On the other hand, the angle D formed between the lower surface of the base 20 and the virtual line IL passing through the center of gravity G and the outer peripheral portion (the arc-shaped outer peripheral portion 20C) of the lower end portion at the rear end of the base 20 in a side view is 67 degrees. As described above, since the position of the center of gravity is located on the rear side of the center line CL as compared with the first embodiment, the angle C is the obtuse angle in the first embodiment, but the angle D is the obtuse angle in the second embodiment. On the other hand, since the position of the center of gravity is also moved downward, the angle D can be set to 80 degrees or less, and suitable stability can be ensured.

Additionally, the position of the center of gravity of the router 100 at the lowest position of the router main body 30 is lower than the position of the center of gravity of the router 100 at the highest initial position of the router main body 30. Therefore, the angle (A, B, C, D) formed between the lower surface of the base 20 and the virtual line IL passing through the center of gravity G and the outer peripheral portion of the lower end portion of the base 20 when viewed from a direction orthogonal to the vertical direction also at the lowest position of the router main body 30 is 80 degrees or less. Specifically, the obtuse angle D is set to 56 degrees, and the other angles (A, B, C) are set to be less than that angle.

As described above, also in the second embodiment, it is possible to suppress a deterioration in the stability of the posture of the router 100. Further, it is possible to perform stable work even when the upper surface of the workpiece W itself below the base 20 is inclined during the work.

Further, in the second embodiment, when the base 20 is disposed in the horizontal direction and the tip tool T performs a cutting process in a vertical posture, the position of the center of gravity in the left and right direction in a side view when the router 100 is viewed from the side as shown in FIG. 15, that is, the front and rear direction of the router 100 is located between the motor 40 and the battery 70 and at a position close to the battery 70. As shown in FIG. 15, since the grip portion 52B of the handle 52 is inclined to the rear surface side of the router 100 in a direction from the front end portion on the side of the base 20 toward the base end portion, it is possible to operate the tip tool T by gripping a position close to the center of gravity of the router 100 in the horizontal direction while the tip tool T takes a vertical posture and to improve the workability.

Further, as shown in FIG. 15, the cutting work of the work material by the router 100 can be performed with the tip tool T in a vertical posture and the workpiece W is machined with the tip tool T in a horizontal posture.

Figure 17:
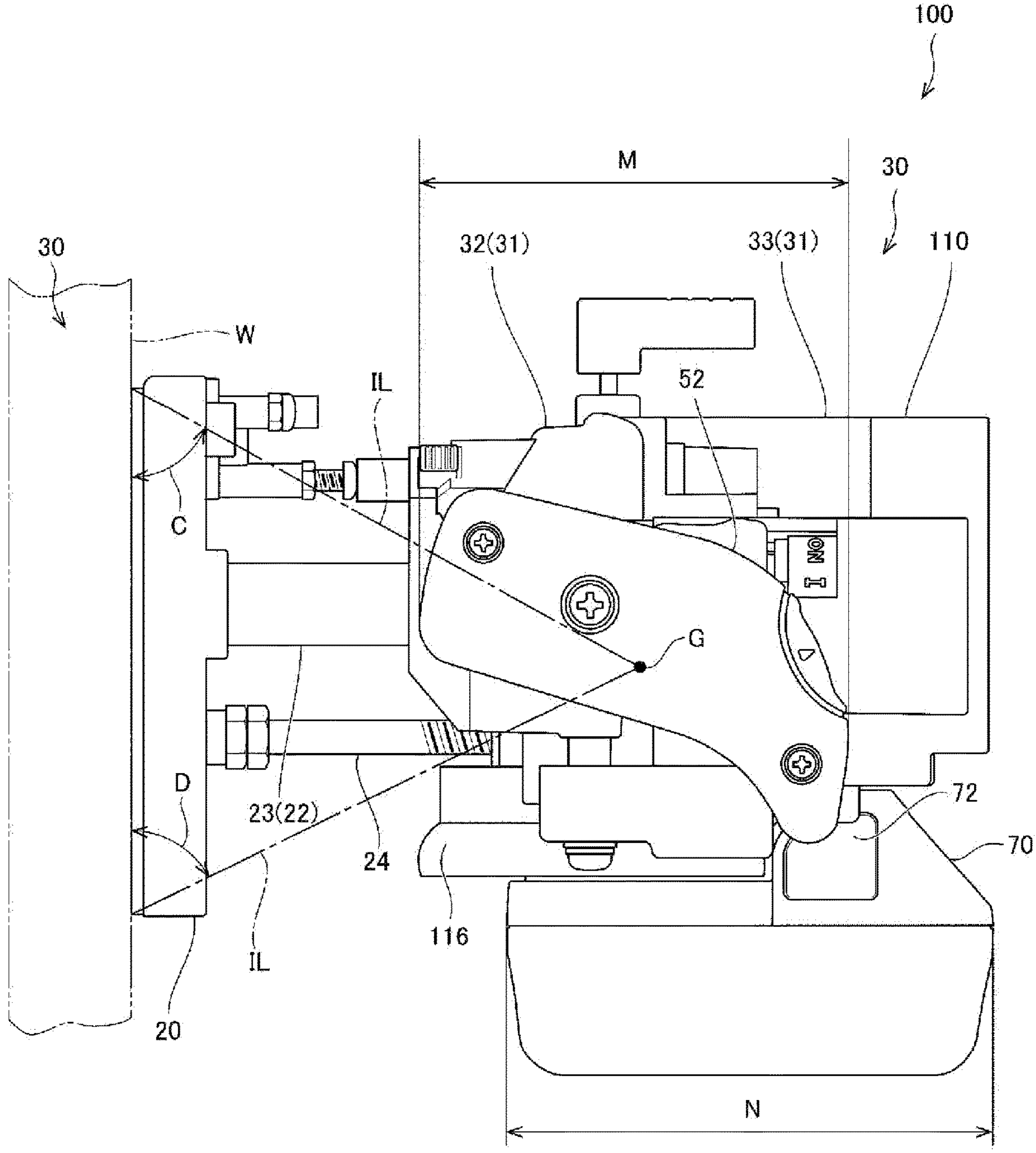
FIG. 17 is a right side view showing the router shown in FIG. 15 in a state in which a base changes its posture from a horizontal state to a vertical state.
Figure 18:
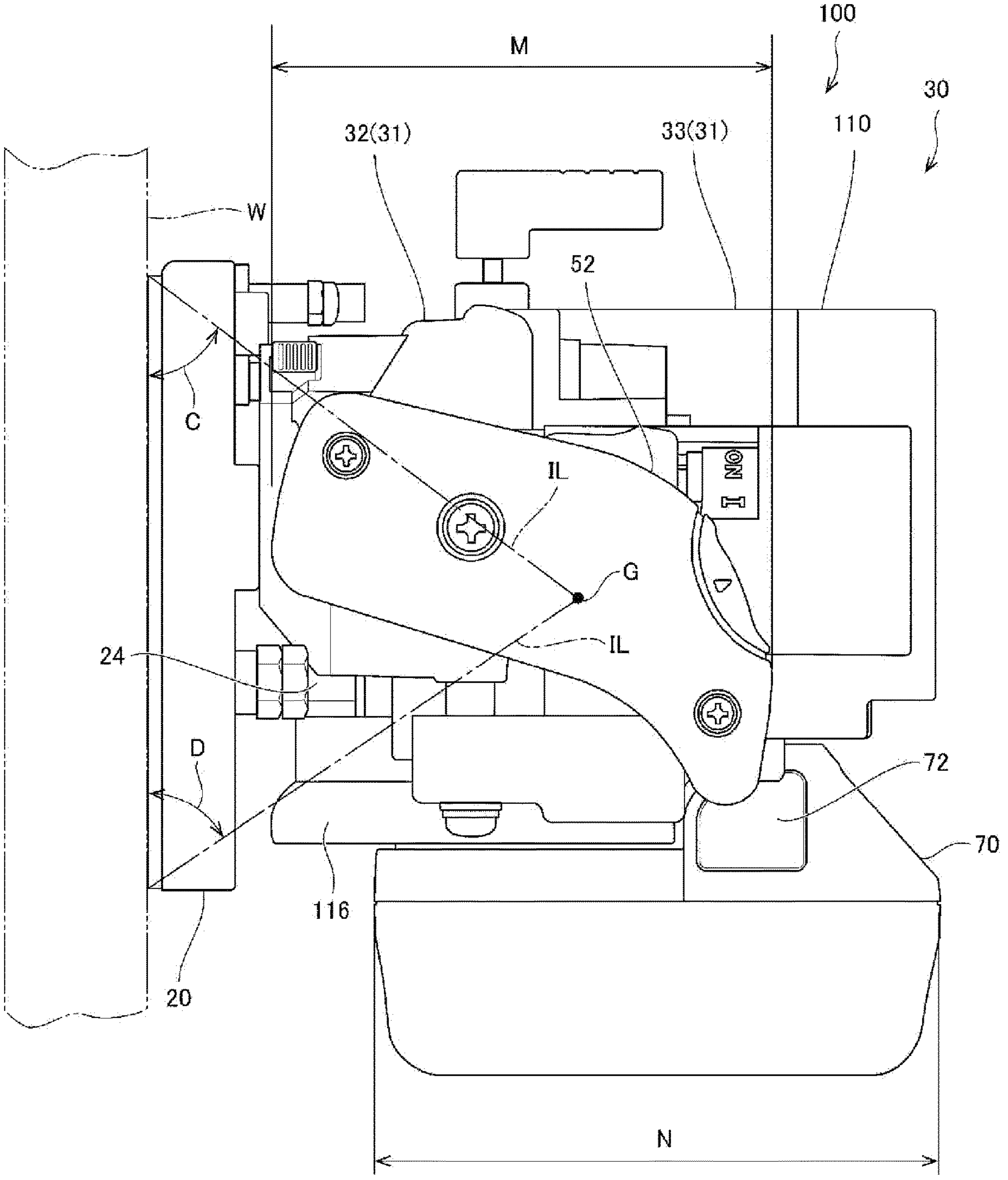
FIG. 18 is a right side view of the router in a state in which a router main body approaches the base (lowest position) from the state shown in FIG. 17.

FIG. 17 shows the posture of the router 100 when machining the workpiece W with the tip tool in a horizontal posture. When the base 20 is brought into contact with the workpiece W in a vertical posture, the base 20 takes a vertical posture and the rotation shaft 41 of the motor 40 and the router 100 takes a horizontal posture, that is, a sideways posture. FIG. 18 shows a state in which the router main body 30 is closest to the base 20 from the state shown in FIG. 17.

In this way, it is possible to arbitrarily set the approaching position of the main body housing 31 (the router main body 30) with respect to the base 20 in response to the type of the tip tool even when the workpiece W is machined with the base 20 in a vertical posture. Further, the router 100 may be placed on a mounting surface such as a mounting base in a horizontal posture, that is, a sideways posture during or after machining. For example, there is a case in which the router 100 is placed sideways on a member such as a mounting base or a support base while the tip tool protrudes from the bottom surface of the base 20 until the cutting work at the other position is performed after the cutting work at one position ends. At this time, the rear surface of the battery 70 serves as the lower surface and is disposed on a member such as a mounting base or a support base.

When the end surface on the side of the base 20 in the battery 70 is the front end surface and the opposite end surface is the base end surface, the length of the battery 70 therebetween is the dimension N as shown in FIGS. 17 and 18. The base end surface of the battery 70 is substantially flush with the base end surface of the main body housing 31. Further, when the end surface of the base 20 in the handle 52 is the front end surface and the opposite end surface is the base end surface, the length of the handle 52 therebetween is the dimension M.

The position of the center of gravity of the router 100 in a side view when the router main body 30 is separated from the base 20 to the position shown in FIG. 17 with the base 20 in a vertical posture is the position indicated by the reference numeral G1. The position G1 of the center of gravity at this time is within the range of the length N between the front end surface and the base end surface of the battery 70 as shown in FIG. 17. Further, the position G1 of the center of gravity of the router 100 in a side view is within the range of the length M between the front end surface and the base end surface of the base 20 of the handle 52.

The position of the center of gravity of the router 100 in a side view when the router main body 30 becomes closest to the base 20 to the position shown in FIG. 18 with the base 20 in a vertical posture is the position indicated by the reference numeral G2. The position G2 of the center of gravity at this time is also within the range of the length L between the front end surface and the base end surface of the battery 70 as shown in FIG. 18. Further, the position G2 of the center of gravity of the router 100 in a side view is within the range of the length M between the front end surface and the base end surface of the base 20 of the handle 52. In this way, the positions G1 and G2 of the center of gravity are respectively set within the range of the length N of the battery 70 and the rear surface of the battery 70 (the lower surface of the battery 70 in FIG. 18) and are set within the range of the length M of the handle 52.

Thus, since the positions G1 and G2 of the center of gravity are within the range of the length M of the handle when the operator performs a work by gripping the router 100 from the base end surface side of the router main body 30, that is, the right end surface side in FIGS. 17 and 18, the positions are within the range of the position of the hand for gripping the handle. Accordingly, since the balance of the router 100 becomes satisfactory even when the workpiece W is machined with the base 20 in a vertical posture, the workability is improved.

When the router 100 is disposed in a horizontal posture, that is, a sideways posture during or after machining, the router 100 may be placed sideways on the mounting base or the like with the tip tool protruding from the bottom surface of the base 20. At this time, the rear surface (the bottom surface) of the battery 70 serves as the lower surface and is disposed on the mounting base. Then, since the positions G1 and G2 of the center of gravity are within the range of the length N of the battery 70, the work is continuously performed while the router 100 is stably supported without being tilted or tip over. Accordingly, it is possible to start the work by reliably lifting the router 100 and to improve the workability of the router 100. In other words, since the position of the center of gravity G1 and the position of the center of gravity G2 while the battery 70 is mounted on the battery mounting portion 116 are located within the region of the rear surface as viewed from the normal direction of the rear surface when the rear surface (the bottom surface) of the battery 70 is placed to contact the placement surface of the mounting base, it is possible to perform a stable placement in the horizontal direction.

Further, in the second embodiment, since the battery 70 is disposed on the rear surface side of the router main body 30

Figure 13:
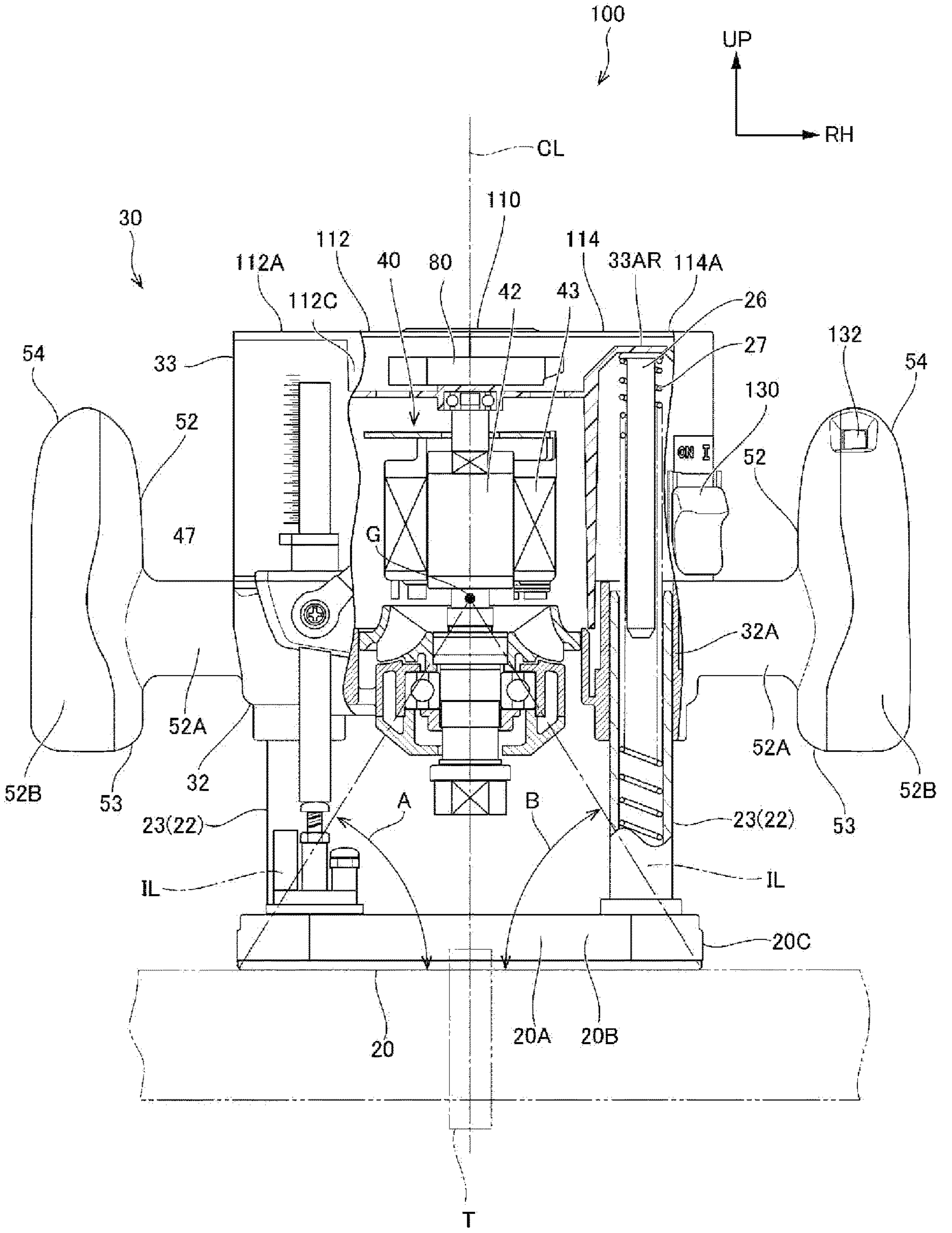
FIG. 13 is a partially broken front view of the router shown in FIG. 12.
Figure 14:
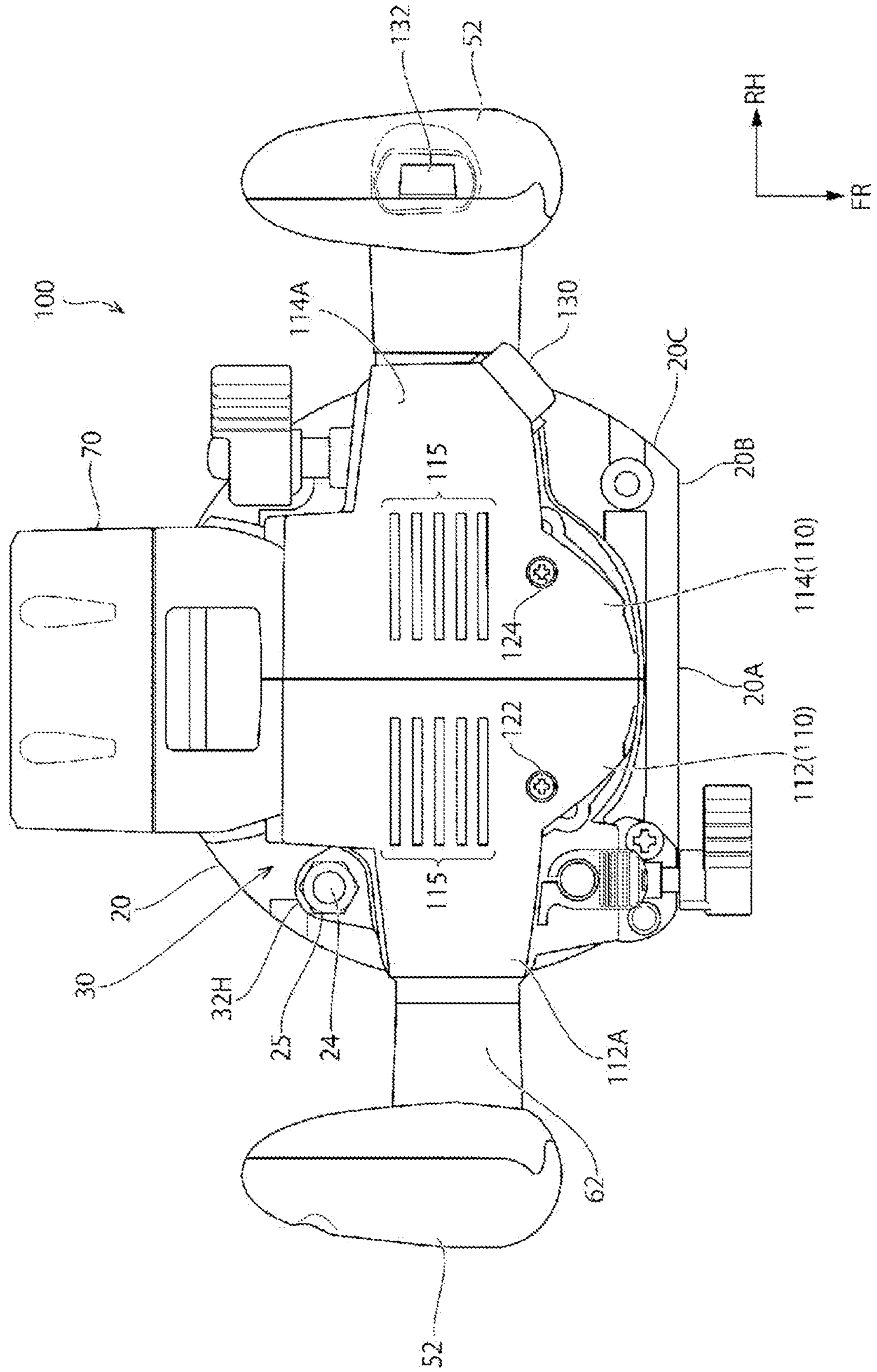
FIG. 14 is a plan view showing the router shown in FIG. 12 when viewed from above.

(the main body housing 31), the stator 43 incorporating the rotor 42 can be located within the range of the length N of the battery 70 as shown in FIG. 13. Accordingly, the position of the center of gravity of the router 100 is not largely changed even when the distance of the router main body 30 with respect to the base 20 is changed and the operability and workability can be improved even when the router 100 is used in a vertical posture or a horizontal posture. That is, since it is possible to locate the position of the center of gravity at the lower position as compared with the above-described embodiment, it is possible to ensure the stability.

The invention claimed is:

1. A working machine, comprising:

a motor including a rotation shaft extending in a vertical direction;

a control unit, having a control board for controlling the motor;

a battery, supplying electric power to the control unit;

a housing including:

a motor housing, having a cylinder portion accommodating the motor;

a holder, holding the battery and the control unit, and covering at least a part of the motor housing; the holder is configured separately from the motor housing;

an end bracket, configured separately from the motor housing; the end bracket holding a bearing for supporting the rotation shaft of the motor;

a right handle and a left handle, fixed to a right side and a left side of the end bracket respectively;

a switch circuit unit, configured to be operated by an operator to drive the motor; the switch circuit unit disposed on one of the right handle or the left handle;

a lead wire connecting the switch circuit unit and the control unit;

a pair of columns, having a cylindrical shape extending in an axial direction of the motor; and a base, fixed to the pair of columns;

wherein the end bracket has an insertion portion for inserting the pair of columns, the base and the pair of columns are movable relative to the housing, such that the end bracket, the holder, the battery, the lead wire and the motor housing are movable relative to the base, wherein a housing side engagement part is provided on the motor housing, wherein the holder is fixed to the motor housing by the housing side engagement part, wherein the housing side engagement part includes at least one of:

(i) an engagement rib located between the pair of columns in a left-right direction and protruding in a front-rear direction; or (ii) a screw fitting hole facing upward, and located between the pair of columns in the left-right direction and forward of an axial center of the pair of columns.

2. The working machine according to claim 1, wherein the holder is directly coupled to the motor housing.

3. The working machine according to claim 1, wherein the housing side engagement part is the engagement rib, wherein an engaged rib protruding in the front and rear direction is provided on the holder, the engaged rib is engaged with the engagement rib in the vertical direction, at least a part of the engaged rib is located below an upper end of the rotation shaft.

4. The working machine according to claim 1, wherein a lead wire guide is provided on the motor housing, a part of the lead wire extending from an inside of the holder toward the switch circuit unit passes the lead wire guide in the vertical direction, wherein in plan view, the engagement rib is provided within a predetermined angular range with a center line of the rotation shaft as a center, and at least one of the pair of columns and/or the lead wire guide is disposed at a location avoiding the predetermined angular range wherein the housing side engagement part is the engagement rib.

5. The working machine according to claim 1, wherein the housing side engagement part is the screw fitting hole, a screw receiving portion is provided on the holder penetrating the vertical direction.

6. The working machine according to claim 5, wherein the holder includes a left side holder configuring a left side and a right side holder configuring a right side, the motor housing has the screw fitting hole provided on each of a left side and a right side, the screw receiving portion is provided on each of the left side holder and the right side holder.

7. The working machine according to claim 1, wherein an intake hole for guiding cooling air to an inside of the holder to cool the control unit is provided on the holder, the control unit has a first surface facing the motor and a second surface opposite the first surface, the cooling air flows between the intake hole and the second surface and cools the second surface.

8. The working machine according to claim 7, wherein the intake hole is provided on a wall side of the holder that is located facing the control board.

9. The working machine according to claim 1, wherein the motor housing includes a right side column accommodation portion on a right side and a left side column accommodation portion on a left side for accommodating a part of the pair of columns, the holder includes a pair of rails for holding the battery, an entirety of the pair of rails is provided between right side column accommodation portion and a left side column accommodation portion in the left and right direction.

10. The working machine according to claim 9, wherein the pair of rails extend in a direction perpendicular to the left and right direction.

11. The working machine according to claim 1, wherein the housing includes a wiring storage space on a radially outer side of the cylinder portion, at least a part of a power line connecting the control unit and the motor is located in the wiring storage space.

12. The working machine according to claim 11, wherein the base has a linear outer peripheral portion extending in the left and right direction, the linear outer peripheral portion is provided on a front side of the base in the front and rear direction, and the wiring storage space is located on a rear side of the housing in the front and rear direction.

13. A working machine, comprising:

a motor having a rotation shaft extending in a vertical direction that is supported by a first bearing and a second bearing;

a control unit, having a control board for controlling the motor;

a battery, supplying electric power to the control unit;

a motor housing, having a cylinder portion accommodating the motor and a first bearing holding part holding the first bearing;

a holder, holding the battery and the control unit, and covering at least a part of the motor housing; the holder is configured separately from the motor housing;

an end bracket, configured separately from the motor housing; the end bracket having a second bearing holding part holding the second bearing;

a right handle and a left handle, fixed to a right side and a left side of the end bracket respectively;

a switch circuit unit, configured to be operated by an operator to drive the motor; the switch circuit unit disposed on one of the right handle or the left handle;

a lead wire connecting the switch circuit unit and the control unit in the holder;

a pair of columns, having a cylindrical shape extending in an axial direction of the motor; and a base, fixed to the pair of columns;

wherein the end bracket has an insertion portion for inserting the pair of columns, the base and the pair of columns are movable relative to the end bracket, such that the end bracket, the holder, the battery, the lead wire and the motor housing are movable relative to the base, the holder is connectable to the battery and holds a battery connector which supplies electrical power of the battery to the control unit, the first bearing holding part is provided at an upper part of the motor housing, the control unit is located in a space that is positioned between the first bearing holding part and the battery connector in the vertical direction, and wherein an engagement rib is provided on the motor housing and protrudes in the front and rear direction, the engagement rib is engaged with the holder in the vertical direction.

14. The working machine according to claim 13, wherein when viewed in plan view, a center location of the battery connector in the left and right direction is shifted from a center line of the rotation shaft, and an entirety of the battery is located inside of an outer peripheral of the base.

* * * * *